(12) United States Patent
Snider et al.

(10) Patent No.: US 7,947,954 B2
(45) Date of Patent: May 24, 2011

(54) APPARATUS AND METHODS FOR USE IN FLASH DETECTION

(75) Inventors: Robin Terry Snider, Fallbrook, CA (US); Jeffrey Dykes McGee, San Diego, CA (US); Michael Dale Perry, Poway, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 12/778,040

(22) Filed: May 11, 2010

(65) Prior Publication Data

US 2011/0095187 A1 Apr. 28, 2011

Related U.S. Application Data

(63) Continuation of application No. 11/557,830, filed on Nov. 8, 2006, now Pat. No. 7,732,769.

(60) Provisional application No. 60/734,906, filed on Nov. 8, 2005.

(51) Int. Cl.
*G03B 15/00* (2006.01)
(52) U.S. Cl. ............. 250/336.1; 340/540; 396/263
(58) Field of Classification Search ............... 250/336.1, 250/363.03, 369; 340/540; 396/263
See application file for complete search history.

(56) References Cited

U.S. PATENT DOCUMENTS

| | | | |
|---|---|---|---|
| 5,662,333 A | 9/1997 | Allen | |
| 5,686,690 A | 11/1997 | Lougheed et al. | |
| 6,496,593 B1 * | 12/2002 | Krone et al. | 382/104 |
| 6,621,764 B1 | 9/2003 | Smith | |
| 6,625,399 B1 | 9/2003 | Davis | |
| 6,825,792 B1 | 11/2004 | Letovsky | |
| 7,732,769 B2 | 6/2010 | Snider et al. | |
| 2003/0222976 A1 | 12/2003 | Duran | |
| 2006/0021498 A1 * | 2/2006 | Moroz et al. | 89/41.06 |

FOREIGN PATENT DOCUMENTS

WO WO2007/056753 5/2007

OTHER PUBLICATIONS

Moroz, et al.; "Airborne Deployment of and Recent Improvements to the Viper Counter Sniper System"; Naval Research Laboratory, Washington, D.C.; 1999; 8 pages.

Patent Cooperation Treaty; "International Search Report" for International Application No. PCT/US2006/060683 which corresponds to the present application; Mar. 31, 2008; 2 pages.

Patent Cooperation Treaty; "Written Opinion of the International Searching Authority" for International Application No. PCT/US2006/060683 which corresponds to the present application; Mar. 31, 2008; 6 pages.

(Continued)

*Primary Examiner* — David P Porta
*Assistant Examiner* — Mark R Gaworecki
(74) *Attorney, Agent, or Firm* — Fitch, Even, Tabin & Flannery

(57) ABSTRACT

The present embodiments provide methods, systems and apparatuses that detect, classify and locate flash events. In some implementations, some of the methods detect a flash event, trigger an imaging system in response to detecting the flash event to capture an image of an area that includes the flash event, and determines a location of the flash event.

16 Claims, 30 Drawing Sheets

OTHER PUBLICATIONS

Patent Cooperation Treaty; "International Preliminary Report on Patentability" mailed May 29, 2008 for International Application No. PCT/US2006/060683 which corresponds to the present application; 8 pages.

United States Army Space and Missile Defense Command, "Overwatch ACTD: Overwatch Advanced Concept Technology Demonstration," Sep. 12, 2005, 2 pages.

United States Patent & Trademark Office, "Office Action" mailed Jul. 24, 2008 for related U.S. Appl. No. 11/557,830, 9 pages.

United States Patent & Trademark Office, "Office Action" mailed Jun. 11, 2009 for related U.S. Appl. No. 11/557,830, 9 pages.

United States Patent & Trademark Office, "Notice of Allowance" mailed Jan. 26, 2010 for related U.S. Appl. No. 11/557,830, 7 pages.

United States Patent & Trademark Office, "Interview Summary" mailed Nov. 2, 2009 for related U.S. Appl. No. 11/557,830, 3 pages.

* cited by examiner

*1020*

*1120*

(a) Monolithic

*1220*

(b) Quad Array

*1320*

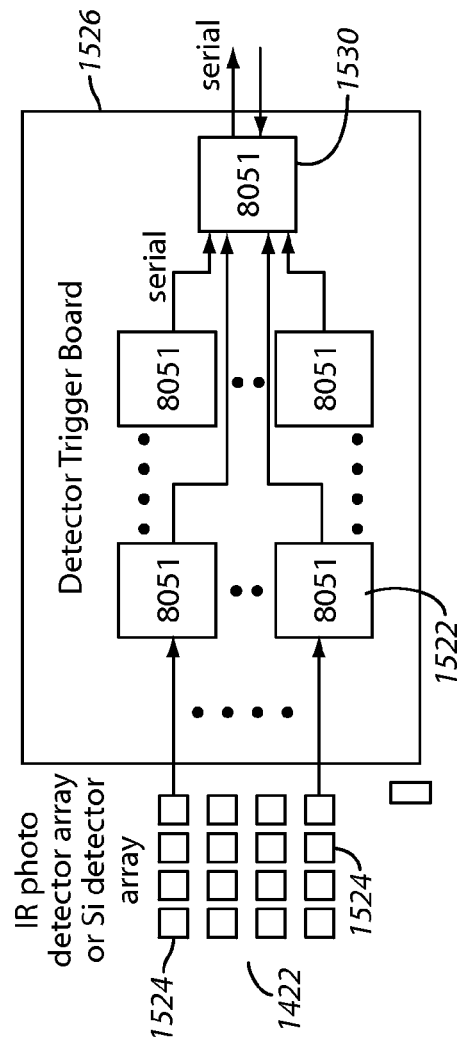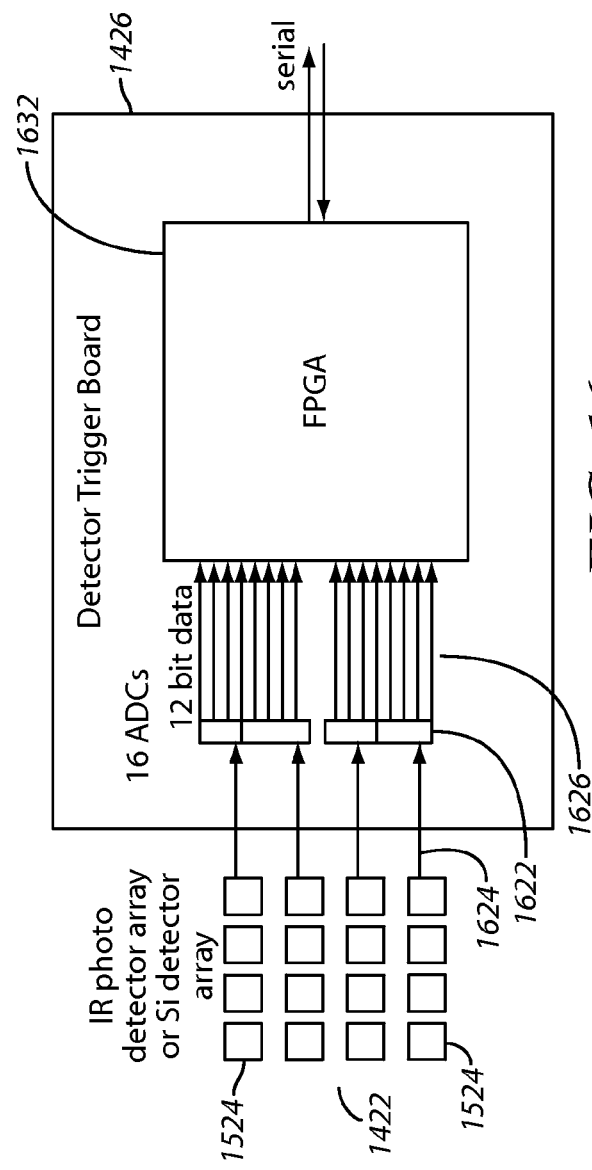

1720

1820

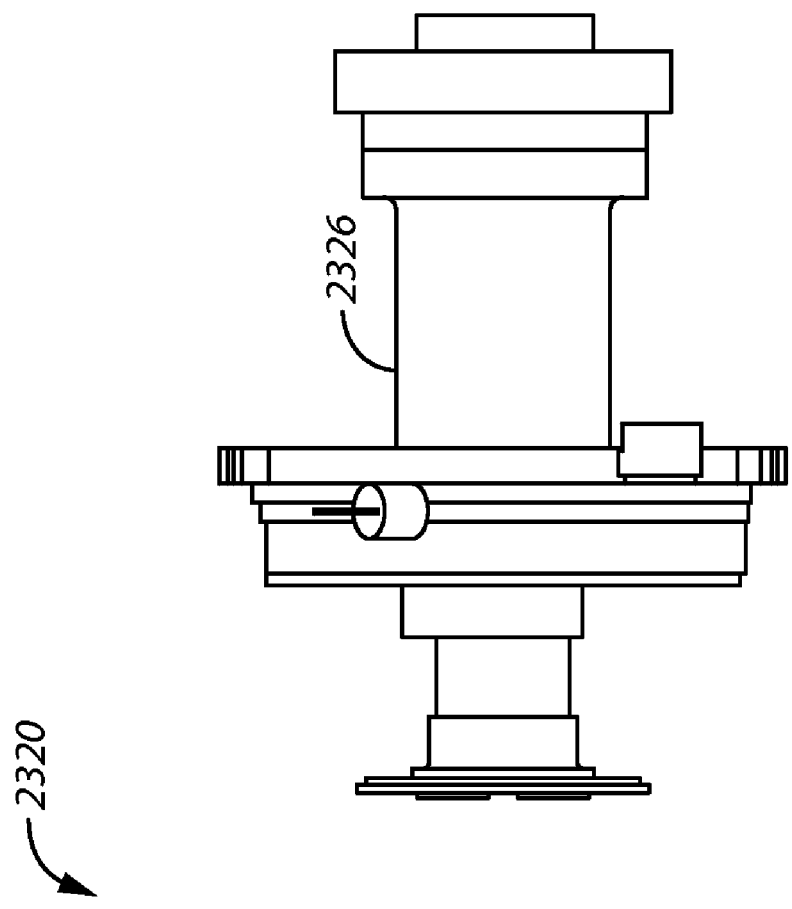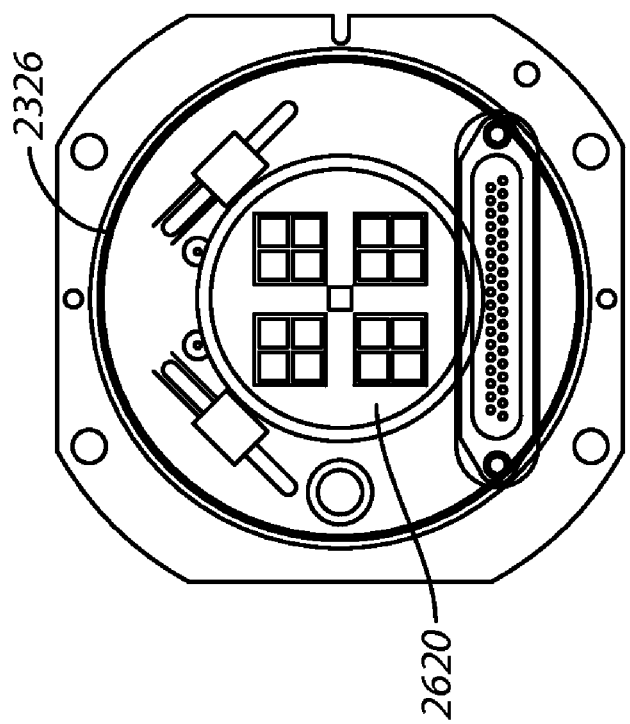
FIG. 26

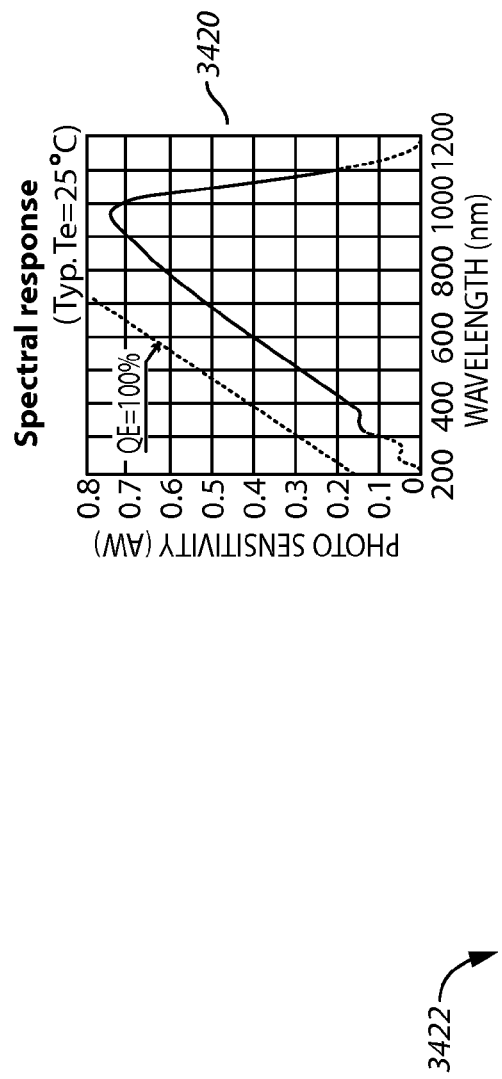

Absolute maximum ratings (Ta=25°C)

| Parameter | Symbol | Value | Unit |
|---|---|---|---|
| Reverse voltage | VR Max. | 20 | V |
| Operating temperature | Topr | -40 to +100 | °C |
| Storage temperature | Tstg | -40 to +125 | °C |

Electrical and optical characteristics (Ta=25°C, per 1 element, unless otherwise noted)

| Parameter | Symbol | Condition | Min. | Typ. | Max. | Unit |
|---|---|---|---|---|---|---|
| Spectral response range | λ | - | - | 320 to 1100 | - | nm |
| Peak sensitivity wavelength | λp | - | - | 960 | - | nm |
| Photo sensitivity | S | λ=λp | 0.6 | 0.72 | - | A/W |
| Short circuit current | Isc | 100 lx, 2856 K | - | 6.5 | - | μA |
| Dark current | ID | VR=10V, all element | - | 0.4 | 2 | nA |
| Cut-off frequency | fc | VR=10V, RL=50Ω λ=780nm,-3 dB | 10 | 20 | - | MHz |
| Terminal capacitance | Ct | VR=10V, f=1 MHz | - | 10 | 20 | pF |
| Cross-talk | - | VR=10V, λ=780 nm | - | 2 | 5 | % |

*FIG. 34*

APPARATUS AND METHODS FOR USE IN FLASH DETECTION

PRIORITY CLAIM

This application is a continuation of U.S. application Ser. No. 11/557,830, filed Nov. 8, 2006, now U.S. Pat. No. 7,732, 769, for Snider et al., entitled APPARATUS AND METHODS FOR USE IN FLASH DETECTION, which claims the benefit of U.S. Provisional Application No. 60/734,906, filed Nov. 8, 2005, entitled APPARATUS AND METHODS FOR USE IN FLASH DETECTION, both of which are incorporated herein by reference in their entirety.

FIELD OF THE INVENTION

The present embodiments relate generally to detecting flashes, and more particularly to detecting relatively short duration flashes.

BACKGROUND

The necessity to provide persistent, wide-area surveillance of city size regions has emerged as a critical need for both law enforcement and military applications. Determination of the location and identity of flash events within the area under surveillance enables time critical decisions to be made on the allocation of resources. Only a limited number of technical approaches have been applied to this problem. To date, these approaches have suffered from limited range, the need for large amounts of processing power, large apparatus, or combinations of these which make employment on airborne platforms problematic. The present invention overcomes these limitations.

SUMMARY OF THE EMBODIMENTS

The present embodiments advantageously addresses the needs above as well as other needs through the provision of the methods, apparatuses and systems for use in detecting flashes produced in launching and/or firing of projectiles, such as but not limited to mortars, rocket-propelled grenades (RPGs), small rockets, artillery, bullets and/or other such projectiles. The system also addresses large events such as ignition of explosive devices (e.g., roadside bomb, car bomb, mortar detonation, etc). In some implementations, some of the methods detect a flash event, trigger an imaging system in response to detecting the flash event to capture a first image including at least a portion of the flash event, and determine a location of the flash event.

Further, some methods detect a flash event, temporally evaluating the flash event, determine whether the flash event is an event of interest based on the temporal evaluation, and trigger an imaging system to capture a first image including the flash event when the flash event is an event of interest.

Some methods detect a flash event, determine a portion of a temporal signature of the flash event while the flash event is in progress, evaluating the portion of the temporal signature, determine whether the flash event is a flash event of interest based on the portion of the temporal signature, and trigger an imaging system to capture an image including a portion of the flash event when the flash event is determined to be a flash event of interest based at least on the portion of the temporal signature.

Other embodiments provide systems that detect flash events. Some of these systems comprise a first detector that detects a flash event and generates a first detector output representative of the detected flash event, an imaging system and a discriminator coupled with the first detector and the imaging system, wherein the discriminator receives the first detector output, determines whether the flash event is a potential flash event of interest and triggers the imaging system to capture a first image including at least a portion of the flash event when the flash event is the potential flash event of interest.

Further embodiments provide methods of detecting flash events. These methods detect a flash event, spectrally evaluate the flash event, determine whether the flash event is an event of interest based on the spectral evaluation, and trigger an imaging system to capture a first image including at least a portion of the flash event when the flash event is an event of interest. In some instances, the detection of the flash event further comprises detecting a first wavelength band of at least a portion of the flash event and a second wavelength band of at least a portion of the flash event and wherein the spectrally evaluating the flash event comprises determining a spectral signature of the flash event as a function of the detected first wavelength band of the flash event and the detected second wavelength band of the flash event.

Still other embodiments provide methods of detecting a flash that detect a flash, capture a first image including a portion of the flash event, capture a second image that does not include the flash event, and process the first and second images with respect to the flash event. The processing in some instances can include subtracting the second image from the first image and producing a difference image comprising the portion of the flash event.

Further embodiments provide methods of detecting a flash event from weaponry. These methods include detecting the flash event from the weaponry, and taking a first image including the flash event in response to detecting the flash event. In some implementations, these methods can further take a second image that does not include the flash image, and subtract the first and second images to produce a difference image containing the flash event. The taking of the second image can include taking the second image that has a field of view that is substantially equal to a field of view of the first image.

Some embodiments include methods of detecting a flash that detect a flash and trigger to capture an image of at least a portion of the flash in response to detecting the flash.

Other embodiments provide methods of determining a location of a flash that include capturing a first image including a portion of a flash event, capturing a second image that does not include the flash event, processing the first and second images with respect to the flash event and producing a correlated image, and evaluating the correlated image and determining a location of the flash event based on the evaluation of the correlated image.

Some implementations provide computer readable mediums that comprise a physical medium and a set of instructions stored on the physical medium that when executed by a processor are adapted to receive a flash detection signal indicating that a flash is detected, and output a trigger signal to trigger the capturing of an image of at least a portion of the flash in response to the detecting the flash.

Further embodiments provide computer-readable mediums encoded with data and instructions. The data and instructions cause an apparatus executing the instructions to receive a flash detection signal indicating that a flash is detected and output a trigger signal to trigger the capturing of an image of at least a portion of the flash in response to the detecting the flash.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 15 shows a micro-controller acquisition and trigger circuit;

FIG. 16 shows an FPGA based trigger and acquisition system according to some embodiments;

FIG. 26 depicts a scaled, partially transparent cross-sectional view of the detector and a cross-sectional view of the housing;

FIG. 34 shows a graphical representation of a spectral response of photo sensitivity versus wavelength of the detector and ratings and characteristics;

Figure 1:
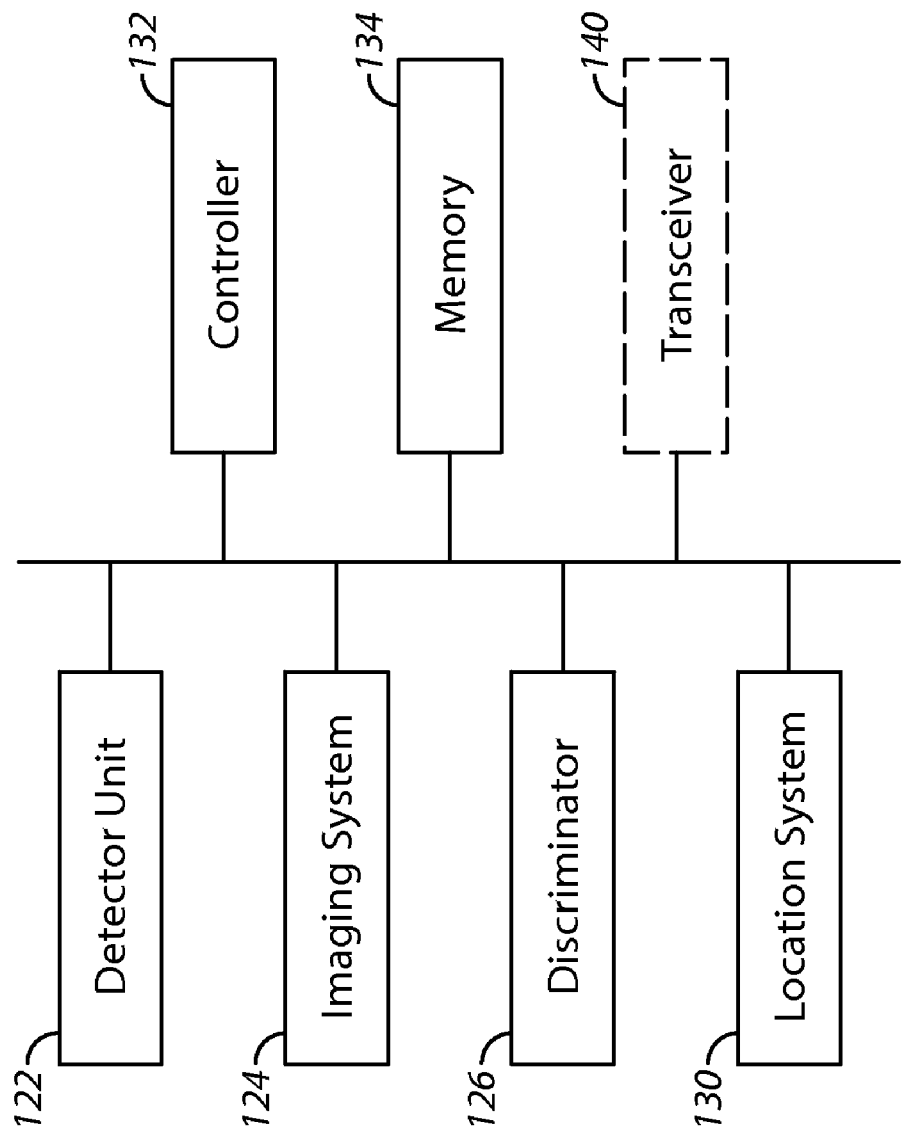
FIG. 1 shows a simplified block diagram of a detection system according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide, at least in part, detection and location of the flash. Further, several embodiments detect short duration flashes (e.g., 0.1-10 ms or longer) over a wide field of view and determine the classification (e.g., type)

of the flash. In some implementations, the detection, classification and locating functions are decoupled allowing for higher temporal resolution of the flash radiometry, lower data rates, spectral discrimination and/or other features and benefits. Some detect, classify and locating short duration events that are accompanied by light emission. Further, these events are often associated with thermal signatures.

Several embodiments allow for detection of short duration flashes over wide fields of view while providing high-fidelity time resolved data of the flash to allow for classification of the source, for example, by temporal and/or spectral characteristics. Detection and classification of the flash, in some embodiments, cues an imaging system and/or device to capture an image (e.g., take a digital image or picture) of a scene during the flash and a subsequent image after the flash has died off. The two images are compared and/or subtracted and the flash emerges as the location showing a large change from one image to the next. To reduce false-alarm rates, some embodiments further include a spectral analysis and spectral trigger that can be used in conjunction with the temporal detector to classify the flash as an event of a particular type.

Further, some embodiments provide methods and systems for use in wide-area flash detection to detect and geo-locate flashes, such as muzzle flashes from mortars, rocket-propelled grenades (RPGs), small rockets in an urban environment, bullets, and other detection and location of substantially any relevant flash. Operationally, these embodiments are capable of providing coverage and/or detection over relatively large areas, such as a square mile or more, with the capability to provide geo-location of a flash to within 100 meters and preferably within 25 meters or less. The location of the flash can then be used, in some implementations, to cue a sensor pod for visual identification and/or targeting. Geo-locating information is determined at least in part by the orientation of the sensor, and in some embodiments by using an IMU/GPS (inertial measurement unit/global positioning satellite) navigation system.

Additionally, the flash detection over a wide field of view (FOV) according to at least some embodiments allows simultaneous coverage of the imaging area at high enough sample rates (e.g., 1-10 kHz) to be able to detect a flash event (e.g., a muzzle flash). Some embodiments employ flash detection that has two enabling components that allow for a robust flash detection system. These components can include a spatial-temporal decoupling scheme that separates the detection and locating functions of the sensor system, and in some instances a temporal and/or spectral trigger that reduces detection rates of non-threatening events and other events that are not of interest.

Short duration flash detection (e.g., muzzle flash detection) over a large field of view can be very difficult. One example of a muzzle flash event has the following approximate parameters: duration of 0.1 to 10 milliseconds; energy content of about 3.7 kJ/gm; charge of about 2 kg; light yield of about 1%; magnitude is about 74 kJ (12 kJ/str). Similarly, solar background can have approximate parameters as follows: reflected solar flux of about 16 W/m$^2$-str; with an integration time of about 5 ms one obtains a reflected solar fluence of approximately 0.08 J/m$^2$-str; area of around 9 km$^2$; and solar radiation of about 720 kJ/str. Solar flux is approximately 60 times brighter than a mortar flash. There can be additional problems in discriminating against solar glint and peaceful light sources versus flash of interest (e.g., muzzle flashes, explosion and the like). Some potential discriminators can include time history, trajectory and spectral signature. Typically, wide field of view, time-integrating camera techniques will generally not provide unambiguous detection and typically cannot discriminate.

The present embodiments can provide wide FOV staring imagery, enable detection of force concentration, vehicle movement, muzzle flash detection and other features and benefits. Further, the flash detection can be implemented in satellite systems, airborne systems, land or water vehicles, carried by individuals and/or other such implementations.

FIG. 1 shows a simplified block diagram of a detection system 120 according to some embodiments. The detection system can include one or more detector units 122, one or more imaging systems 124, a discriminator 126, a positioning or location system 130, a controller 132 and memory 134. The components can be interconnected directly or through networking, bus and/or other such relevant communication links. The detector(s) 122 detects a flash and triggers the imaging system 124. The imaging system captures two images of the same landscape, one that includes the flash and one that does not include the flash. The discriminator 126 compares the images and locates a flash within the comparison. The positioning system 130 determines a location of the flash relative to the position of the flash identified within the discriminator. In some implementations, the discriminator and location system isolate the image of the flash in the comparison and determine location information base on the relative location of the isolated flash image (e.g., identifying one or more pixels). The detection system 120 and/or the components of the system can be implemented through hardware, software or a combination of hardware and software.

The controller 132 provides overall system control and/or actives the various components of the system 120, and can be implemented through a processor, microprocessor, microcontroller, field programmable arrays (FPGA), computer and/or other relevant controller or combinations of controllers. The memory 134 stores digital data, programs, executables, code, statistics, parameters, libraries (e.g., temporal and/or spectral signature libraries), characteristics and/or other relevant information. One or more of the components of the detection system 120 can access the memory 134 in utilizing the programs, data, libraries, and/or other information, and/or for storing data. The memory can include volatile and nonvolatile, removable and non-removable media implemented in substantially any relevant method or technology for storage of information such as computer readable instructions, data structures, program modules or other data. For example, the memory can include, but is not limited to, RAM, ROM, EEPROM, flash memory or other memory technology, CD-ROM, digital video disk (DVD) or other optical disk storage, magnetic cassettes, magnetic disk storage or other magnetic storage devices, or any other medium which can be used to store the desired information and which can be accessed by the controller and/or other components of the detection system 120. Additionally or alternatively, the memory can be included in one or more of the other components of the system (e.g., the imaging system can include memory, the detector(s) can include memory, the discriminator can include memory, there can be separate memory and/or other configurations) and/or can be remote memory (e.g., accessed over wired, wireless and/or a distributed network such as the Internet).

In some embodiments, the detection system 120 optionally includes a communication transmitter and/or transceiver 140. The transceiver allows the detection system 120 to communication at least the location information of the detected flash. For example, the location information can be transmitted to a sensor turret and/or the operator to allow for visual confirmation and/or targeting of the location. For example, the imaging system and/or a secondary camera can be aimed at the identified location allowing a user to see the location, evaluate the location and circumstances around the location, such as identifying vehicles and/or individuals instigating the flash event, determining whether further events are likely to occur (determining whether launching device is being re-loading) and/or other evaluations; and/or to direct responses (e.g., strike back based on location information). Further, the transceiver allows the system to receive information, data, updates, revisions and the like. The detection system 120 can be implemented, in some instances, through off-the-shelf components that are relatively low in cost, with relatively easy assembly. Further, the processing preformed by the system is relatively minimal, in part due to the triggering of the imaging system 124 and/or an imaging device of the imaging system, and thus, the reduced number of images that have to be evaluated along with the changes in positioning compensation processing that is associated with the capturing of a series of relatively large numbers of images. The reduced processing allows the system to be implemented with relatively simple processors and/or reduced numbers of processors.

Figure 2:
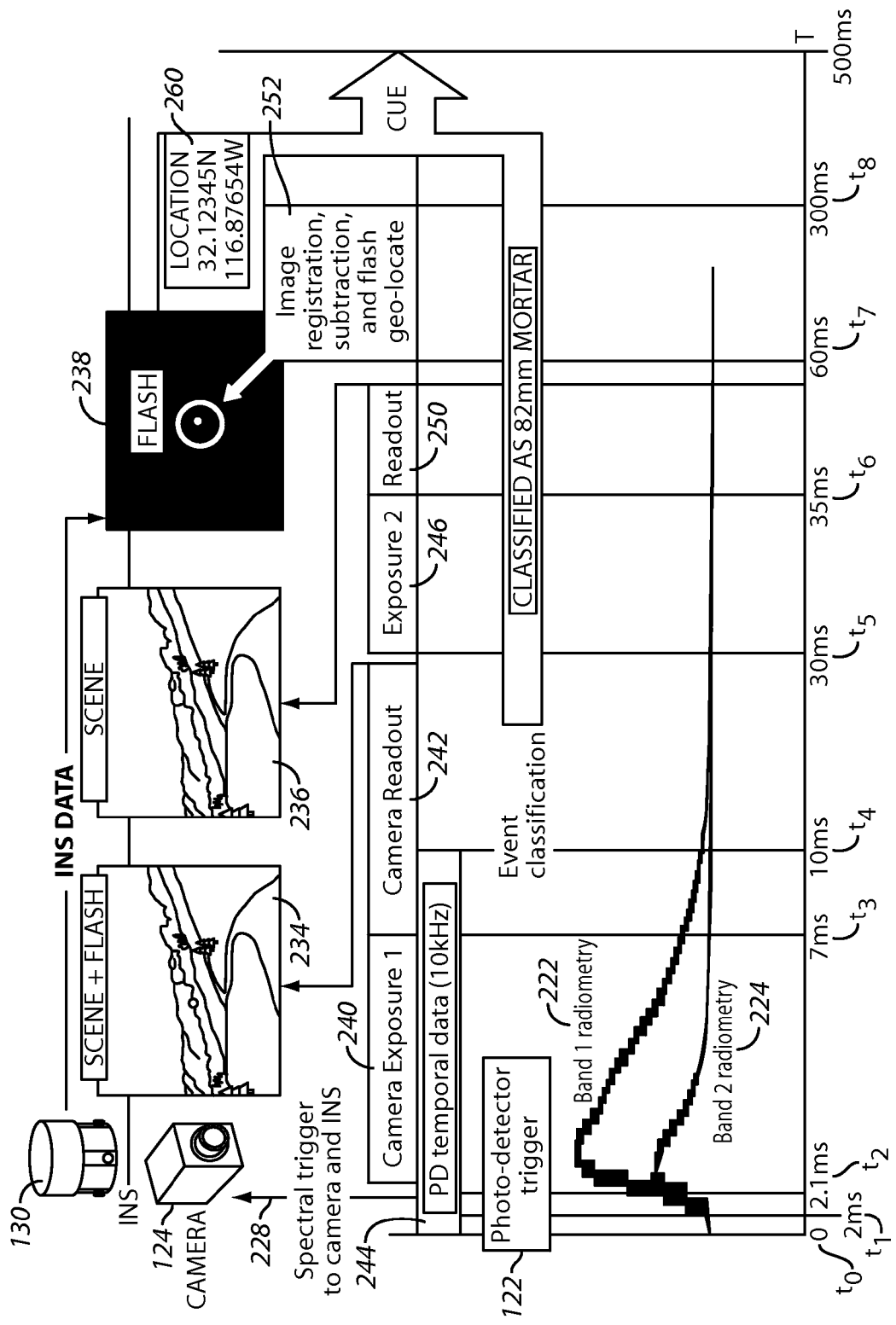
FIG. 2 depicts an example of a block diagram basic operational time line for some embodiments of decoupled flash detection and geo-locating.

FIG. 2 depicts an example of a block diagram basic operational time line 220 for some embodiments of decoupled flash detection and geo-locating. The time line 220 includes a first band detection radiometry 222 and a second band detection radiometry 224 over time. One or more detectors 122 are employed to activate an imaging system 124 and the location system 130 that are employed in generating images and determining a location of the detected flash. At time zero (t0) a flash is initiated at a remote location. At time t1, the detector(s) detects the flash. The detector at time t2 triggers 228 the imaging system 124 to activate and capture an image of a scene with the flash 234. The trigger 228, in some instances, is activated when a detected level of light exceeds a threshold level. Further in some embodiments, an evaluation of the detected flash event is performed to determine whether the flash event is an event of interest, such as a muzzle flash or the like. This evaluation can include a temporal and/or spectral evaluation. In some instances, the temporal evaluation can include determining whether the detected rise time of the detected flash matches an expected and/or known rise time. Additionally or alternatively, spectral evaluations can be performed, such as evaluating multiple different detected wavelength bands and/or comparing signatures of these wavelength bands relative to known and/or expected signatures and/or ratios of signatures.

In some embodiments, the imaging system 124 includes one or more cameras and/or other imaging device(s), and at least one of the cameras or imaging devices is activated for a first exposure period 240 between times t2 and t3. The image data is read out during a period 242 between time t3 and about t5. A determination is made in some embodiments during an evaluation period 244, for example, between times t1 and t4 whether the event can be recognized, identified and/or classified, for example based on a comparison with known flash characteristics, temporal signatures and/or spectral signatures. The evaluation period 244 can for example be determined by detected signal levels crossing thresholds, both on the rising and falling edge (where the thresholds can be the same or different values), rise time and/or other such aspects that define the period. Additionally, the thresholds on the rising and/or falling can be adjusted.

Further, the evaluation can be based on a temporal and/or spectral evaluation of the flash event. As introduced above, the spectral evaluation can be based on two or more sensors detecting different ranges of wavelength bands. The multiple bands can provide a spectral signature of the event that can be compared with known spectral signatures. Similarly, the temporal aspect of the flash event can be compared with temporal characteristic of known flash events. In some embodiments, a transform, such as a Fourier transform or other similar transform can be applied to the output signals from the detectors to produce transformed signatures that can be readily compared with known transform signatures of known flash events.

At a time t5 the imaging system 124 captures a second image 236, some times referred to as a background image. This image typically is of substantially the same area or field of view as that captured in the first image, without the flash event. The activation of the imaging system at time t5 is intended to be after an expected duration of the flash such that the second image 236 does not include the flash and is just the view or scene. Again the imaging system can employ a camera that is exposed for a second exposure duration 246. In some embodiments, the duration in acquiring of the second image is similar to or substantially the same as the duration in capturing the first image. Further, some implementations allow the exposure time to vary, and in those varying instances, the duration of the second exposure is typically similar or about equal with the exposure time in capturing the first image.

As introduced above, the detected flash event can be evaluated to determine whether the event is a flash event of interest. This can include a temporal and/or spectral evaluation of one or more detected wavelength bands. This evaluation can be performed prior to and/or during the triggering of the imaging system in capturing the first and/or second images.

The second image is read out 250 at time t6. During an evaluation period 252 between times t7 and t8 the first image is compared with the second image. In some instances, a resulting difference or processed image 238 is produced that can be evaluated to identify a location 260 of the detected flash. When a location is determined, and in some instance when the event is recognized and/or classified, a cue or other notification is transmitted, for example, to a sensor turret, vehicle, personnel, an operator and/or other destinations.

As introduced above, the detector 122 can include a two-band photo-detector unit (or more bands) to detect a flash event and when it is determined (e.g., based on the temperature) the flash is that of a muzzle flash, a trigger 228 is sent to the imaging system 124 and location system 130, which in some embodiments can be implemented at least in part through an inertial navigation system (INS). The photo-detector unit 122 continues to acquire data and determines whether the event is classified as a muzzle flash, for example, based on temporal and/or spectral data. The imaging system 124 acquires an image and/or picture of the scene and the flash. A second image and/or picture is acquired after the flash has dissipated. The images are registered, subtracted, and the pixel(s) where the flash occurred is identified. The location and/or INS data can be used to determine geo-coordinates of the event. If the event is classified as a flash of interest (e.g., weapon muzzle flash), the coordinates can be used to cue a sensor turret, an operator, devices, vehicles and/or units located proximate the identified geo-coordinates, and/or other individuals and/or devices (e.g., aircraft, ship, headquarter personnel and the like).

Decoupled Detect/Geo-Locate Flash Detection Scheme

A focal plane array (FPA) of an infrared (IR) imager has been determined to typically have enough sensitivity and small enough instantaneous field of view (IFOV) to detect muzzle flashes and/or some other flashes. A standard imager operating at, for example, a typical 30 Hz frame rate generally may not be able to detect a desired flash since the exposure time of the camera may not coincide with the flash event. Increasing camera exposure time generally is not desirable due to pixel saturation, deceases in signal to noise ratio (SNR), or image blurring. Some embodiments address these issues through a custom sensor that increases the sampling rate of the camera up to 1 kHz (operating at higher frequency may decrease SNR since duration of muzzle flashes is generally at a minimum a few milliseconds). As an example, assume the FPA is 640×512. The data rate produced by such an implemented system is given by:

$$N_{pix} * FR = \text{Data Rate}, \quad (1)$$

where a number of pixels is, for example, $N_{pix}$=640×512 and the frame rate is, for example, FR=1000 Hz. The data rate is on the order of about 5 Gbs. As one can see the data rate can be relatively large. Hardware can be developed to handle these high data rates, however, some embodiments employ software or a combination of hardware and software. In some instances, a system may have difficulty in discriminating flash events from clutter (e.g., solar glints) when the sample rate is relatively low compared to flash duration and generally no spectral information is available. In some implementations the system analyzes the FOV temporally to detect and geo-localize the flash with a single sensor.

Some embodiments separate the detection and localization function by operating sensors in such a way as to partially decouple the two-dimension localization function and the one-time dimension detection function. The result of such systems, in part, is that the data rates are typically much lower and the temporal resolution is relatively much higher. For an example system, a simple photo-detector employed as at least part of the detector 122 can operate at a sampling frequency $f_s$=10 kHz and covers the FOV. As discussed below, 4 to 16 detectors can be used in some embodiments to satisfy a link budget for a 30° FOV system, but other configurations with more or less detectors can be used. In some implementations a larger number of detectors may provide gross geo-location prior to localization by a FPA. A flash event that is detected by the photo-detector can trigger 228 the imaging system 124 (e.g., including a camera) based, for example, on the rising-edge of the voltage signal (e.g., rising edges of signals 222 and/or 224 matches an expected or known rise time). The voltage signal from the detector(s) can be analyzed, in some implementations, to determine whether the temporal characteristics of the signal match that of an expected flash event, such as a muzzle flash event. In some implementations, while the signal is being analyzed, the trigger causes the imaging system 124 to take or capture an image of the scene during the flash event, a typical response time of a FLIR (forward looking infrared) camera is on the order of 20 μs.

A second image can then be taken or captured. The second image can be provided by a second camera or the same camera. The two images are correlated and/or subtracted from one another providing a correlated or difference image 238 that can be used in determining a geo-location of the flash event. The data rate for such a system according to some embodiments can be given by:

$$N_{det} * f_s + N_{pix} * FR = \text{Data Rate}, \quad (2)$$

where, according to some embodiments, the number of photo-detectors can be $N_{det}$=1, $N_{pix}$=640×512, FR=2 Hz, the data rate is 10 Mbs assuming one flash event a second, which can be about 2 to 3 orders of magnitude lower than the single sensor system with about a ten-fold increase in temporal resolution. In some forms, the spatial-temporal decoupling concept provides a hi-fidelity time history of the signal and produces a geo-location by separating the two functions of detection and determining location. The validity of this approach has been demonstrated with a 5° FOV photo detector and an infrared (IR) and/or InGaAs imager with mortars and small-arms at extended ranges. Some field tests are described in detail below.

According to some embodiments, the detector 122 is implemented through photo-detector(s) that operate between 1-10 kHz, cover a significant portion, all or an excess of a system FOV, and operate in AC-coupled mode that aids in removing low-frequency background. In some instances, link-budget parameters determine the photo-detector pixel size and instantaneous FOV (IFOV) of the pixel (the link budget is described in detail below). In some implementations, the system may utilize more than one pixel. If so, multi-pixel sensors can be developed by several methods such as assembling one or more commercial-off-the-shelf (COTS) sensors on a single substrate, developing a large-pixel very low resolution (4×4 or 5×5) focal plane array using existing CMOS or CCD technology(ies), or other such relevant technologies and/or combinations of such technologies.

Spectral Triggering

Figure 3:
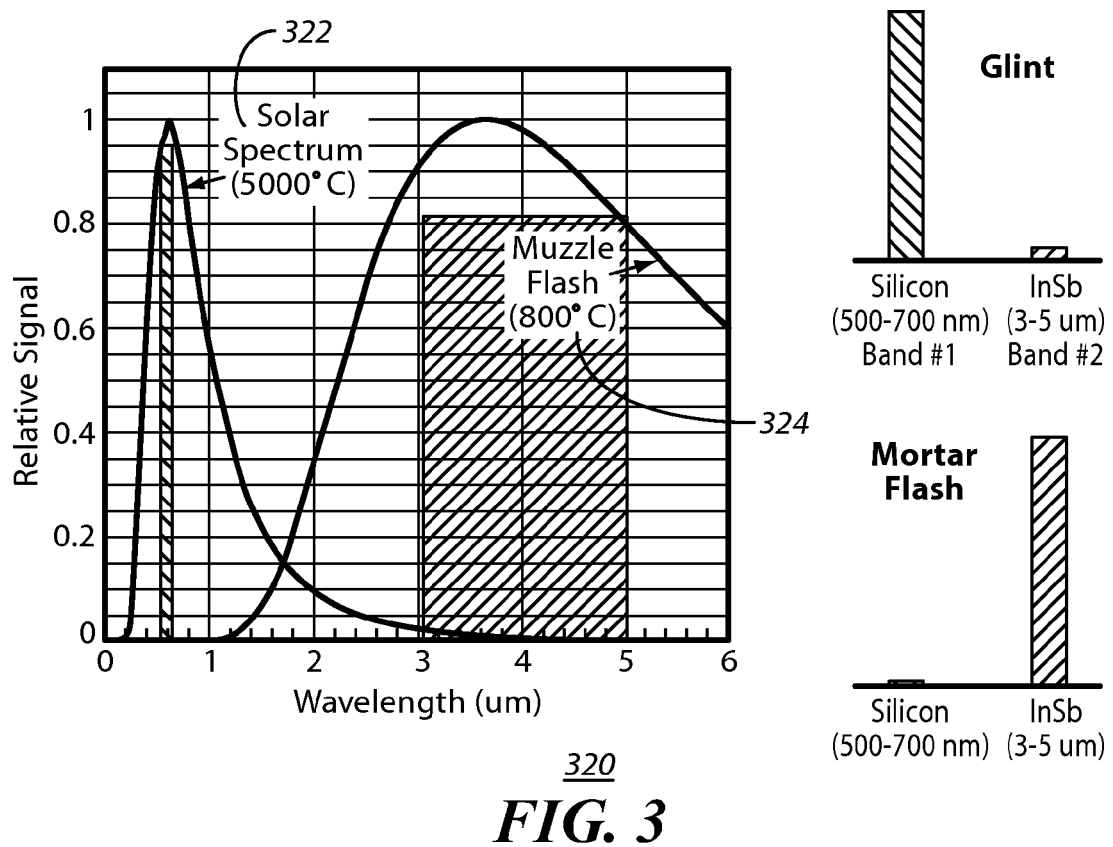
FIG. 3 depicts a simplified graphical representation of spectral discrimination of a glint and an example muzzle flash.

In some embodiments of the decoupled flash detection scheme, the imaging system 124 typically is triggered by the rising edge of one or more pulses (e.g., pulses 222, 224 detected by the detector(s) 122). This may result in some implementations in the triggering 228 of the imaging system before the pulse can be analyzed to determine whether the pulse temporal characteristics match that of one or more predefined flash characteristics, such as muzzle flash characteristics and/or does not match one or more predefined characteristics for flashes of non-interest. To decrease the number of triggers on clutter and/or flashes of non-interest (e.g., a solar glint), a second photo-detector can be added to the system in some embodiments. This detector can operate in a different wavelength or spectral band (e.g., visible band of 400-1100 nm). By operating in two bands, this effectively measures the temperature of the flash event. Solar glint is typically measured at about 5000° C. and the ratio of visible to IR is almost 1000:1. Muzzle flashes are around 800° C. and the ratio of visible to IR is about 1:100. FIG. 3 depicts a simplified graphical representation of spectral discrimination 320 of a glint 322 and an example muzzle flash 324. Other embodiments can perform at least a temporal evaluation of a temporal signature, such as the rise time of the signal. The imaging system can be triggered when the evaluation determines that the detected rising edge of the one or more pulses correlates with an expected or known temporal signature.

Figure 4:
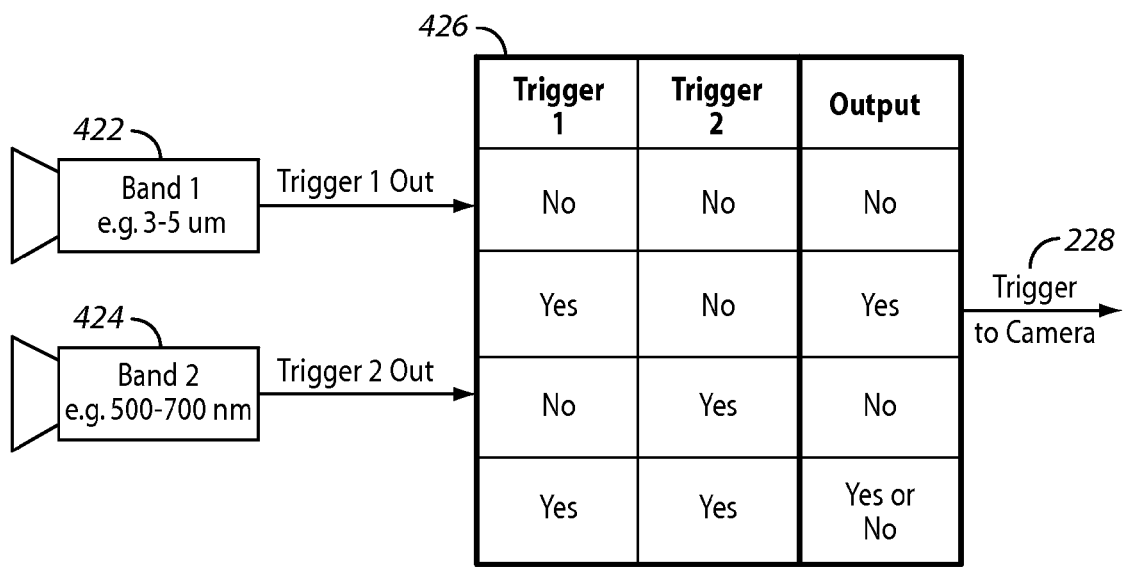
FIG. 4 depicts a simplified block diagram of a discrimination system that is employed in some embodiments to discriminate between flashes of interest and not of interest.

FIG. 4 depicts a simplified block diagram of a discrimination system 420 that is employed in some embodiments to discriminate between flashes of interest (e.g., muzzle flashes) and events not of interest. Two photo-detectors 422, 424 each configured to detect different wavelengths or spectral bands can operate in conjunction with a logic circuit 426 to discriminate events of non-interest (e.g., solar glint). The logic circuit 426 can be implemented through hardware, software or a combination of hardware and software. A trigger from a first band (Band 1) detector 422 (operating for example between 3-5 μm) with no trigger from the second band (Band 2) detector 424 (operating for example between 500-700 nm) is indicative of a low temperature event such as a muzzle flash and produces a camera trigger 228. A valid trigger on both channels could be interpreted as an interesting event such as a large explosion, or in some implementations and/or instances could be ignored.

System Architecture and Operation According to Some Embodiments

Figure 5:
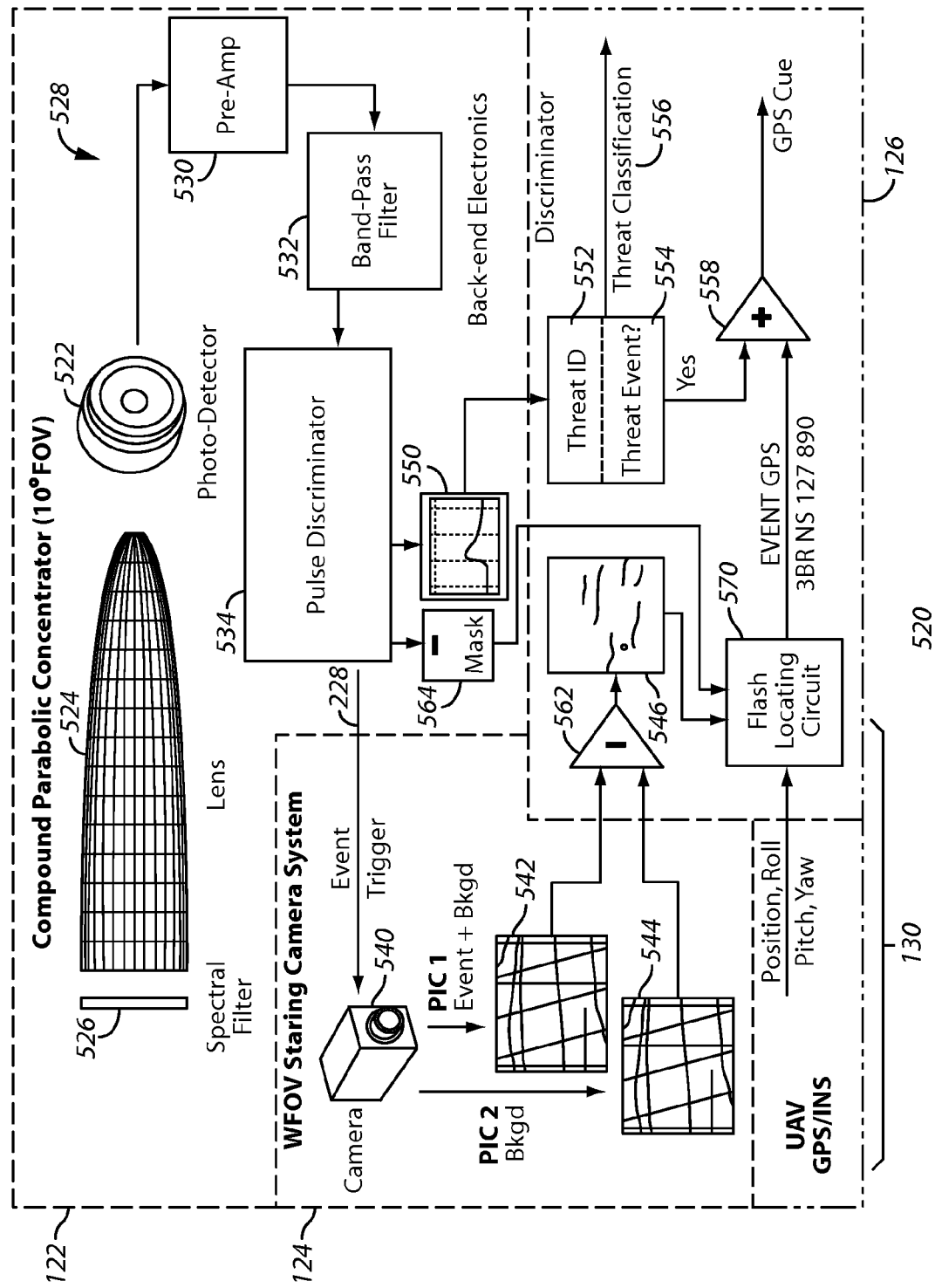
FIG. 5 depicts a simplified block diagram of a system architecture according to some embodiments for use in flash detection.

FIG. 5 depicts a simplified block diagram of a system architecture 520 according to some embodiments for use in flash detection. The system includes the detector unit 122, imaging system 124, comparison unit or discriminator 126, location system 130 and other components. The detector unit 122 includes photo-detector 522 (note that one band is shown and that multiple bands could be included) that provides a system trigger 228, in some implementations, based on, temporal, spectrum and/or flash intensity. A lens 524 is typically included and optically aligned with the photo-detector 522, and in some implementations a spectral filter 526 is aligned with the lens 524. Back end electronics 528 can be included, such as a pre-amplifier 530 and band-pass filter 532 that process the signal from the photo-detector 522 and forward the detection signal (e.g., pulse(s) 222, 224) to a pulse discriminator 534, which in some embodiments can at least in part be implemented through the discrimination system 420 of FIG. 4.

Following a valid trigger 228, a camera 540 (e.g., WFOV staring camera) of the imaging system 124 is exposed for several milliseconds to capture a first image 542 that includes the flash event. It is noted that rockets, mortars and many other weapon projectiles and other flashes of interest can have a flash duration of between about 0.1 and 10 ms (although other durations can be measured, including durations greater than 100 ms). At some time period, for example starting 20 μs after the end of the readout of the first image, a second staring camera (note for simplicity one camera is shown) acquires the same FOV, and in some instances is for the same integration time. The first image 542 contains the muzzle-flash event, and the second image 544 is nearly the exact same scene with a potential offset, for example, by a maximum of one pixel due to the motion of the detection system and/or vehicle carrying the detection system (e.g., motion of an aircraft). Due to the speed at which the first and second images are captured relative to movement of a device carrying the system, the off-set is typically minimal if any.

The discriminator 126 correlates the first and second images and, in some embodiments subtracting one from the other producing a difference image or map 546 that is used by the location system 130 to identify the location of the one or more pixel(s) where the flash event occurred. This "change detection" technique enhances the signal to noise of the flash event. Since the camera orientation is known (for example, from the aircraft's or other vehicle's GPS and/or IMU), the GPS-coordinates of the source flash event are readily obtained based in part on the known FOV and camera orientations. In addition, the detector unit 122 and/or photo-detector 522 record and/or monitor the time history of the event and/or the spectral signature(s), enabling classification of the flash source as mortar, rocket, RPG, explosive, artillery, IAD, or other relevant event. Firearms, including specific large caliber rifles (~.50 cal or larger) can also be classified, for example, by firing rate when fired in automatic mode. The classification and geo-location of the event can be transmitted automatically to control software to direct a gimbal and within a relatively brief period of time (e.g., about half a second) to command authority, personnel and/or vehicles proximate the identified location and/or other devices or individuals.

Detector Unit

Still referring to FIG. 5, in some forms, the detector unit 122 consists of an array of lensed photo-detectors 522 along with back-end electronics 528 (e.g., pre-amplifier 530 and filter 532) that provide an event trigger 228 to the imaging system 124 and a time-dependent voltage signal 550 (which is proportional to the flash radiometry) to the discriminator 126. The photo-detectors 522 provide the time resolved and/or spectral information at least for flash classification and suppression of false detections.

In some embodiments, the system 520 employs an initial link budget for the photo-detectors based on collected radiometric data on known, expected and/or desired flash events of interest, such as mortar systems, in the visible spectrum and other data in the near infrared (NIR). Operating the photo-detector in the 3 to 5 micron range typically yields a much larger signal to background ratio which should enable detection at the objective range. Some implementations of the system use double-band operation, for example: Band 1 of between about 800 to about 1100 nm and Band 2 of between about 3 to about 5 μm. This enables a robust detection system for a wide variety of flash events, such as munitions, at a range of at least about 5 km. Additionally or alternatively, data has been collected that supports a band 2 shift to a narrow solar blind band in the NIR.

Flash Discriminator

The flash discriminator 126 receives the two images, pictures, frames or the like from the imaging system 124, and in some embodiments further receives input from the detector unit 122 and the INS/GPS data from the aircraft or other platform location systems 130. The photo-current, voltage and/or other data 550 from the detector unit 122 is converted to a digital signal that can be used in defining a threat identification 552, where the threat identification can be compared to a library of time-dependent radiometric threat signals for classification 556. In some embodiments, the time dependent signal 550 is converted to a digital signal that is further transformed, for example through a Fourier transform or producing a resultant transformed threat identification 552 that is a signature of the detected flash event. This signature can be compared with known event signatures in attempts to identify the event.

Figure 6:
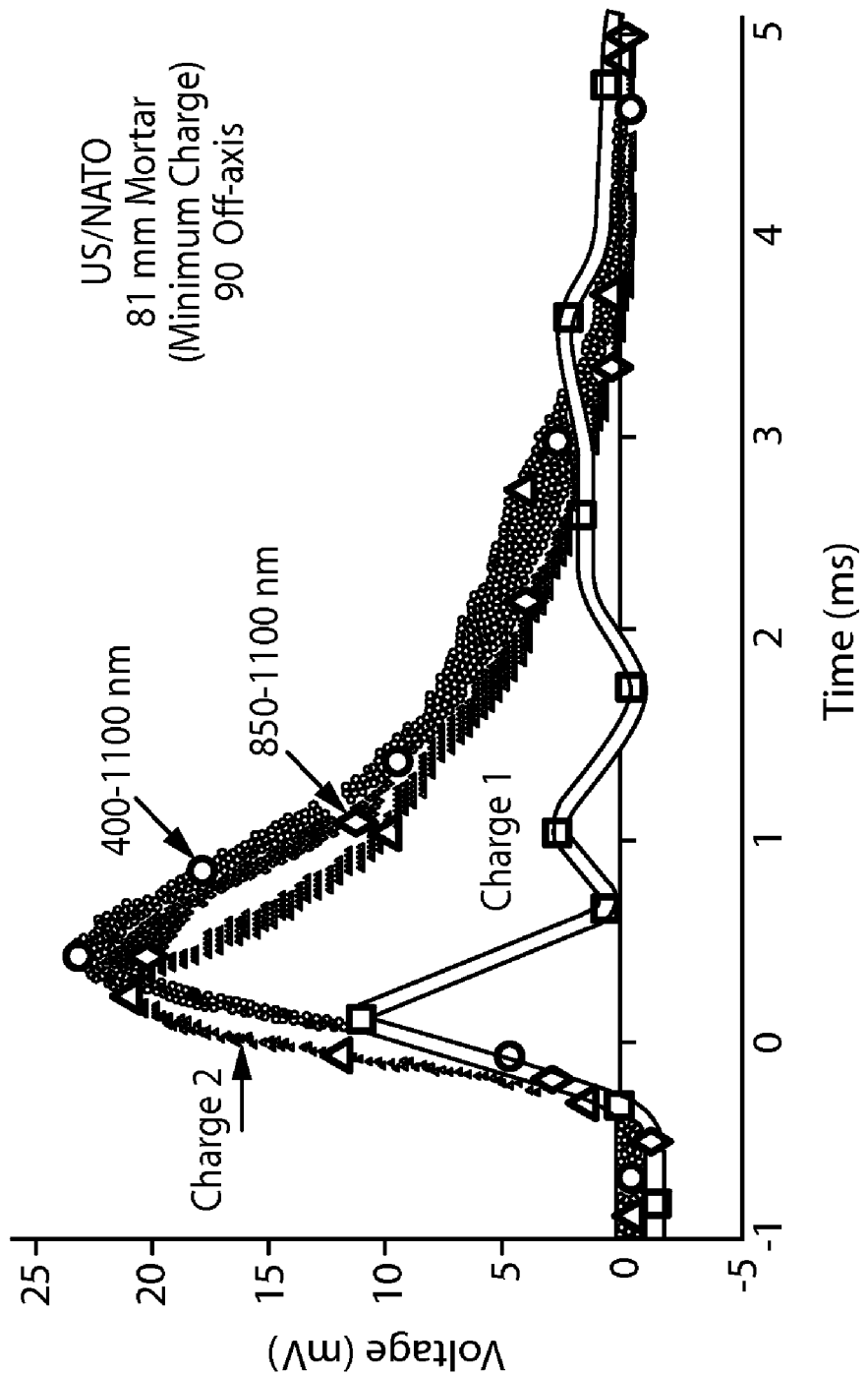
FIG. 6 is a graphical representation of time-dependent emissions over the 400 to 1100 nm range from the launching of a representative mortar viewed at 90° from the muzzle.

A comparator 554 determines whether the detected flash event based on the threat identification 552 is a flash of interest (e.g., a muzzle flash), and forwards a positive indication 558 when a match is detected. FIG. 6 is a graphical representation 620 of time-dependent emissions over the 400 to 1100 nm range from the launching of a 81 mm mortar viewed at 90° from the muzzle.

The implementation of the dual spectrum detection, in some embodiments, advantageously allows at east in part threat discrimination. In order to determine the validity of a threat, the comparator 554 can perform a comparison not only with known spectral content and time histories (as mentioned above), but is also is some embodiments by comparing other similar events, such as solar glint and/or other such events. Further, the dual spectrum detection allows discrimination based on signal magnitudes within one or more bands and/or each band. For example, solar glint typically has much more power in the 800-1100 nm band than in the 3-5 μm band (see for example, FIG. 3). This is dependent on the size of the reflective source, but it has been determined experimentally that even a 6 to 10 m² reflective surface area typically has lower power per solid angle (W/sr) than a charge 2 mortar flash. Further, glint typically has different temporal characteristics than flash events.

The system 520 further includes an image correlator or subtractor 562. Location and/or GPS coordinates are determined based on a correlation and/or subtraction of the event imagery (e.g., first image 542) from the background imagery (e.g., second image 544). The image subtractor can, for example, subtract the background imagery from the event imagery producing a difference image 546 comprising the image of the captured portion of the flash event. In some embodiments, a filtering scheme and/or the gross geo-locating mask 564 can be applied to the different image 546 and the pixel(s) where the event occurred are determined through a flash location circuitry 570, which can be implemented as part of the location system 130, the discriminator 126 or a combination thereof. The pointing direction of the imaging system 124 and/or camera(s) 540 is determined through the location system 130, such as from GPS/INS data that can, for example, be generated from a GPN/INS system on board an aircraft (e.g., a GPS/INS of an aircraft or other platforms) and GPS coordinates associated with the event pixel is then calculated. For example, the GPS/INS data can be used to determine a FOV, and based on the FOV and GPS/INS data determine geo-location information relative to each pixel of an image of the FOV. The determined GPS coordinates of the flash event, in some instances such as when the original signal is classified as a threat, can then be sent (e.g., through the transceiver 140) to an operator, to a gimbal control system, attack vehicle, personnel and/or other such locations. Additional understanding and description of several embodiments are further described below.

Figure 7:
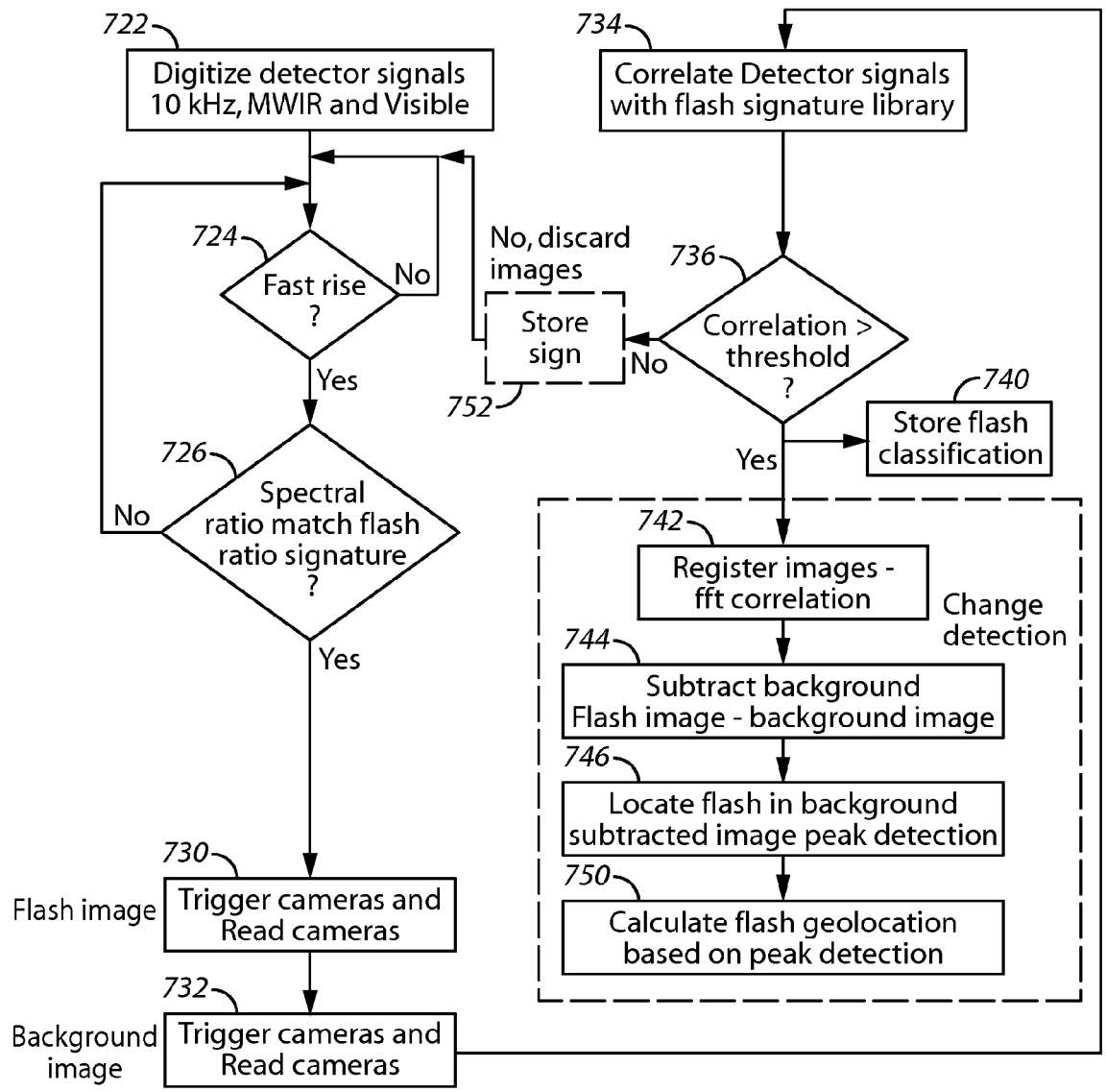
FIG. 7 depicts a simplified flow diagram of a process for use in detecting a flash event.

FIG. 7 depicts a simplified flow diagram of a process 720 for use in detecting a flash event. In step 722, one or more signals from photo-detectors are digitized. As described above, the photo-detectors can operate at one of multiple different sampling rates, for example, sampling frequency $f_s=1$ to 10 kHz or higher, that covers the desired FOV, and often detects multiple spectral bands (e.g., IR, mid wavelength IR (MWIR), visible and/or other relevant bands). In step 724, a temporal evaluation is performed on the digitized detector signals representative of at least a portion of a potential flash event to determine whether the detected event is a potential flash event of interest. In some embodiments, the temporal evaluation can include determining a rise time of a portion of the detector signal and comparing that rise time with expected, known and/or a listing of rise times, whether the rise time exceeds a threshold rise time and/or is within a threshold range, and/or other such considerations. When the temporal evaluation concludes that the detected event does not meet the expected criteria, the process 720 returns to step 722 to await another detection of a detected event.

In step 726, a spectral evaluation is performed on detected signals to determine whether the spectral signature of the detected signals match expected signatures. In some implementations, a ratio of two measured bands is compared with one or more known ratios. For example, the digitized signals are used to calculate a spectral signature based on a ratio of the visible band to IR band. The ratio is compared to a signature library of ratios. In general, the visible band to IR band ratio is typically less then about 0.1. When the spectral signature does not matches the expected signatures the process 720 returns to step 722 to await the detection of another event. Alternatively, when the spectral signature matches the expected signatures, step 730 is entered where the imaging system is triggered to capture a first image including a portion of the flash event, and the first image is read out and/or at least temporarily stored. Step 732 is activated at some time delayed from the initial activation to capture the first image in step 730 to capture a second image. The delay time can be based on the duration of exposure to capture the first image, the time to read out the first image and/or other such factors. For example, in some implementations, step 732 is activated based on a delay time from the initial detection of the flash event, such as 10-20 ms or more from the initial detection such that the flash event has expired and the second image includes the background of the FOV without the flash event. This delay can also be based on one or more expected types of flash events.

In step 734, the temporal and/or spectral signatures determined through steps 722, 724 and 726 are correlated and/or compared with a library of flash signatures. This correlation can include applying one or more transforms to the digitized signals, such as Fourier transform, fast Fourier transform and/or other relevant transforms. For example, a standard Fourier correlation function can be applied to the digitized signal and the signature time histories in the library (e.g., by utilizing substantially any math library application that has such a function, such as MATlab, C programming language that may provide improved speed and robustness, and the like). The function yields a correlation value (typically, 1 is perfect correlation, 0 is completely uncorrelated). In step 736, it is determined whether the determined correlation meets a predefined relationship between the detector signals and one or more of signal signatures of the library, such as the correlation between the detector signals and one of the library signatures that exceeds a threshold level. For example, it is determined whether the determined correlation value exceeds a defined threshold with the threshold value (e.g., defined between 0 and 1) is a value that has been set based on experimental data balancing false alarm rate to false negative rate. In some implementations, the threshold can be, for example, 0.5, 0.75, 0.8 or other such threshold values. Further, the threshold may vary dependent on the classification of the event, expected event(s) and/or the determined event signature(s). Additional thresholds may be utilized, such as a flash duration threshold that indicates that the flash duration is longer than expected and likely not a flash of interest. Other evaluations can be performed on the time history and/or spectral signature of the detected event to determine relevance of the event.

When the correlation does not identify the desired relationship, the process 720 returns to step 722 to await the detection of another flash event to digitize the event. In some embodiments, optional step 752 may be included where the non-correlated detected flash signature(s) is stored locally and/or communicated to a remote cite for storage and/or evaluation. Alternatively, when the correlation between the detect signal signatures and one or more of the library signatures exists, classification of the detected flash event is recorded based on the correlated library signature(s) in step 740, and the process continues to step 742.

In step 742, the first and second images are image registered or otherwise compensating for misalignment and/or otherwise processed, such as performing fast Fourier transform correlations on the first and second images. A change or difference detection is implemented in step 744 where, in some embodiments, the second or background image is subtracted from the first or event image. In step 746, the location of the flash event is identified in the resultant difference image 546, for example using peak detection. In step 750, the process then determines and/or calculates the geo-location of the flash event. In some embodiments, the location system 130, which can include an INS, gives a real time geo-location and orientation of the detector unit 122, for example, based at least in part on IMU and GPS. The INS, in some implementations, can be a dedicated INS, but in alternative applications a platform INS and/or an INS of the vehicle carrying the flash detection system 120 and/or detector unit 122 can be utilized. For example, when the flash detection system 120 is incorporated into an airplane, such as a Predator UAV, the INS of the airplane can be utilized rather than a sensor dedicated INS unit. The geo-location of the sensor and the orientation is then used to calculate were the imaging system is directed or looking in geo-spatial coordinates (just a translation matrix). By knowing the optics details of the imaging system (e.g., instantaneous field of view (IFOV) of each pixel) and the orientation of the imaging system relative to the INS (typically, mechanically fixed) a calculation 750 of the geo-location of the pixel with the peak signal can be made (e.g., again a translation matrix). Some embodiments further include a range detector that can additionally provide range information that can be used in determining geo-location information of the flash event. In those system that do not have a range measurement, assumptions may be made about the range to the location of the flash event, such as assuming that the flash occurs on the surface of the earth but other assumptions could be made depending on the application.

In many embodiments, the processing in triggering the imaging system is relatively simple, and the determination in steps 724 and 726 typically can be preformed before the termination of the flash event allowing the imaging system to be triggered and capture at least a portion of the flash event, typically more than half the duration of the flash event, and in some instances as much as 90 percent or more of the duration of the flash event. This reduces false results and improves reliability. Further in some embodiments, the exposure or integration time of imaging system can be varied. For example with some implementations when attempting to identify multiple different types of flash events, the integration time can be at least partially dependent on the event being detected. In some implementations, for example, a secondary threshold can be employed as a trigger to terminate the exposure or integration of the imaging system, for example, when the detected signal level drops below a second threshold of the fall time, such as at about 90% from peak. This allows the system more flexibility and provides the ability to detect multiple types of flash events during a single operation with no or only minimal adjustments to the system. The duration of the integration can further be monitored and utilized when generating the second image to provide greater consistency between the first and second images that typically results in improved flash detection. Additional thresholds can be included, such as a time threshold that when exceeded indicates that the flash is not a flash of interest (e.g., the flash event extends for too long a period, and thus, is not a muzzle flash or other flash of interest).

Still further in many embodiments, the processing in triggering the capture of the flash event, the correlation of the flash event, the classification of the event and/or the geo-location of the event is relatively simple. This allows the system to be implemented with relatively basic processing capabilities. Additionally, many implementations allow the use of commercially available and/or off the shelf processors that are relatively light with small dimensions. This allows for a processor that is significantly smaller, lighter and occupies less volume than many processors of other systems that attempt to identify and/or locate origins of a flash. Furthermore, many if not all of the components of the detection system 120 can be implemented using relatively simple commercially available components, allowing the system to have a relatively simple design, be easily assembled, have a minimal size and/or volume and be assembled at a relatively low cost. The detection system 120 can be carried and utilized in any number of airplanes, vehicles, ships, satellites and/or other devices, and in some implementations carried and utilized by an individual on foot.

Example of Conceptual Design(s)

In some embodiments, the detection system 120 is developed as a conformal pod, for example, that has a 30° FOV that allows an airborne platform to provide substantially continuous surveillance of an area, e.g., an area the size of a relatively small city, from above the 200 W/sr (Watts/steradian) source threat envelope. The target weight of the pod is less than 100 lbs and in some embodiments about or less than 50 lbs, with a power consumption of less than about 500 W and, in some implementations about 100 W or less. The detection system 120, in some implementations, comprises a detector unit 122 that can include for example one or more detector arrays, imaging system 124 that can include for example one or more cameras, optics, signal processing and controls. Given a 30 degree FOV, geo-location of a flash event will be on the order of 5 m or smaller (based on a 640×512 FPA and a 4 km standoff distance).

Figure 8:
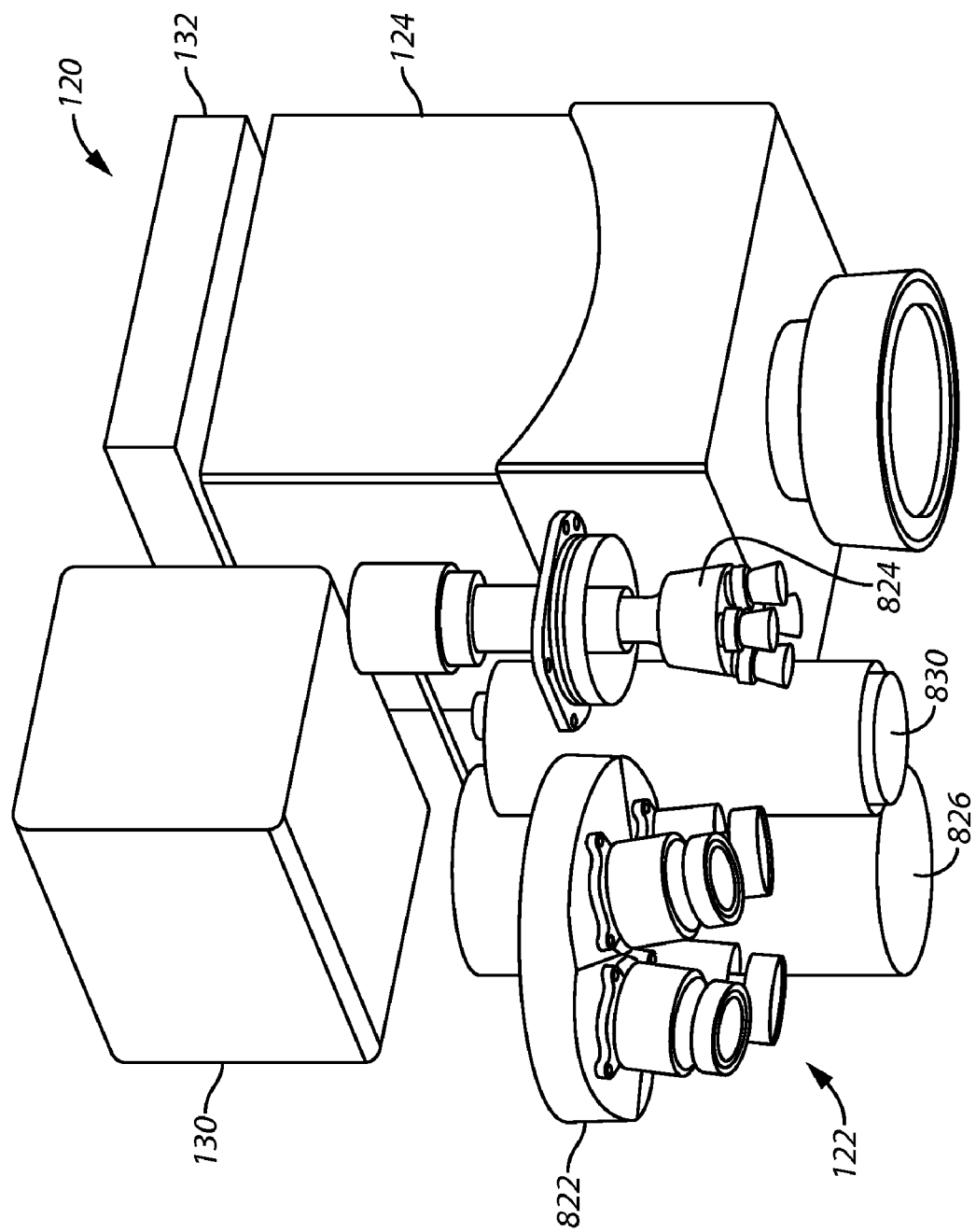
FIG. 8 depicts a simplified perspective view of the detection system according to some implementations.
Figure 9:
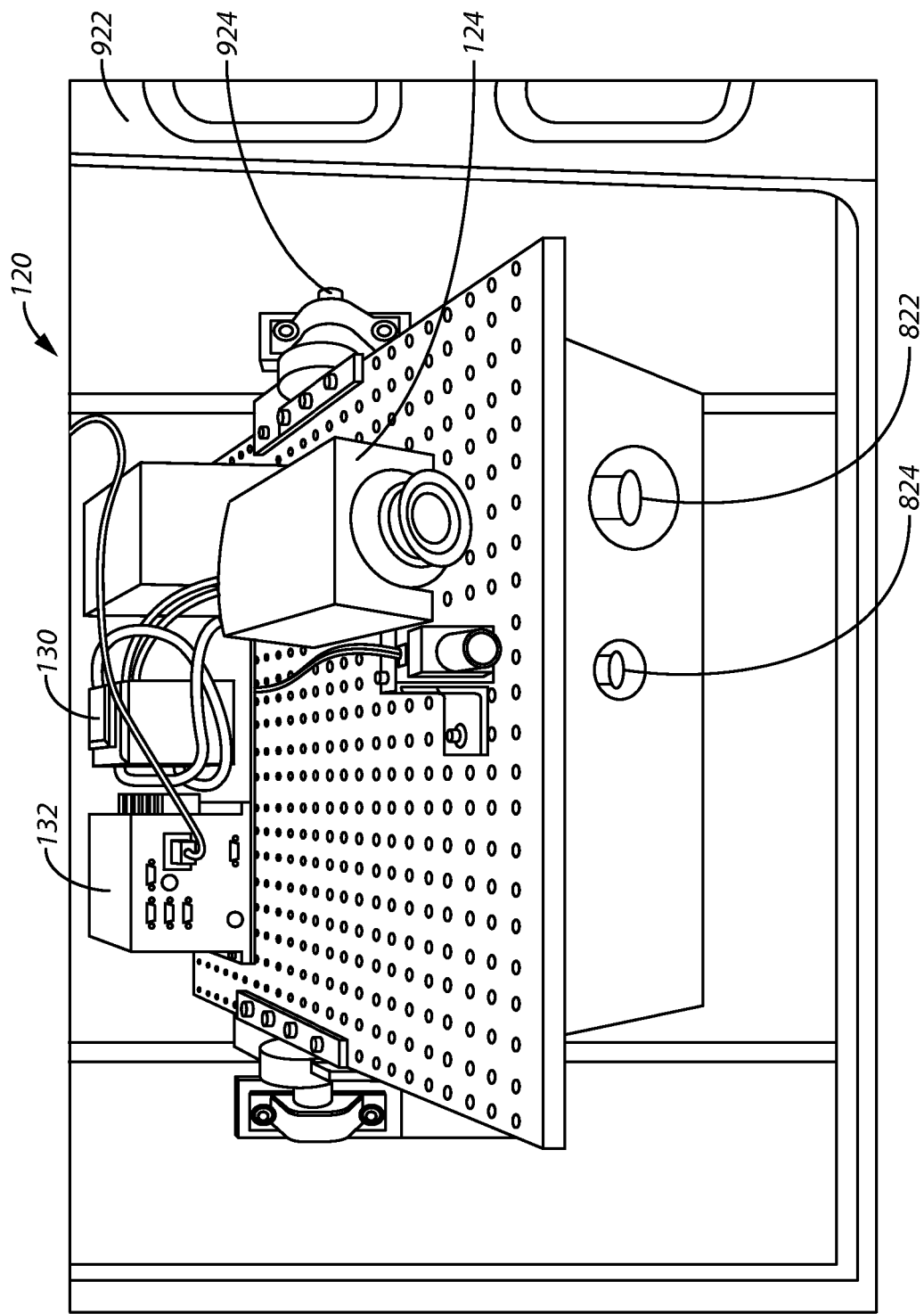
FIG. 9 depicts an image of an example of a detection system mounted within a vehicle, airplane or the like through mountings.

FIG. 8 depicts a simplified perspective view of the detection system 120 according to some implementations. FIG. 9 depicts an image of an example detection system 120 mounted within a vehicle, airplane or the like 922 through mountings 924. Referring to FIGS. 8-9, the detection system includes the detector unit 122, the imaging system 124, the location system 130 and a controller or processing system 132. The controller further comprises memory and a discriminator, and can be implemented through a simple processor and/or multiple processors, hardware, software and/or a combination thereof (e.g., through one or more 8051s, PC104s and/or other relevant controllers or combinations of controllers). Additional or alternative memory can be included. The location system 130 can include an INS/GPS module and/or other such location detection devices (e.g., a C-Miget III INS system). In some embodiments, the imaging system 124 includes a FLIR camera (such as a mid-wave IR imaging camera, or other relevant camera). The detector unit 122 can include a first detector 822, a second detector 824, InSb detector secondary volumes 826 and a cryo-cooler sample 830. The first detector, for example, can include a silicon based quad array detector. The second detector, for example, can include an Indium Antimonide (InSb) detector, such as a tactical dewar assembly.

Link Budget

Figure 10:
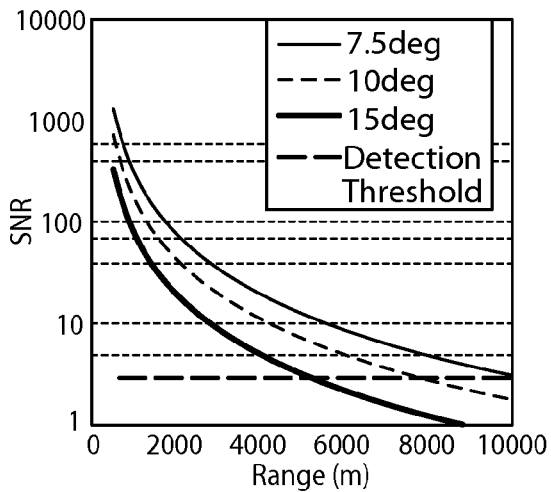
FIG. 10 shows a graphical representation of SNR as a function of FOV for mortar threats based on radiant energy and a threshold detection level.
Figure 11:
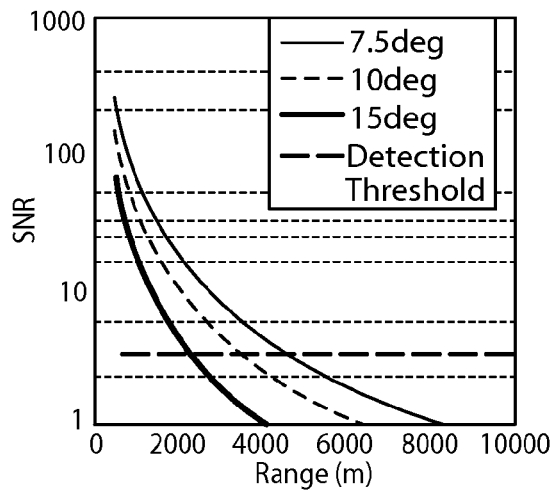
FIG. 11 shows a graphical representation of SNR as a function of FOV for source threats and a threshold detection level.

Based on a calibrated/validated link budget model, as described further below, curves were derived based on both mortar and 200 W/sr source threats and their respective source radiant energies. The detection system 120 can detect both mortars and 200 W/sr source, and assuming a minimum SNR of 3, triggers the imaging system (having, in some instances, a FOV of about 10 degrees or less). Below are equations for the system from which system specifications can be derived according to some embodiments.

$$SNR_{det} = C_1 * \frac{P * D_D^2}{FOV^2 * f^2 * D_{pix} R^2} \qquad (3)$$

$$SNR_{bkgd} = C_2 * \frac{P * D_D^2}{FOV^3 * f^2 * R^2} * SNR_{det} \qquad (4)$$

$$FL = \frac{D_d}{FOV} \qquad (5)$$

$$D_A = \frac{D_d}{FOV * f} \qquad (6)$$

where the above variables are defined as:
P=Power
$D_d$=Detector size
$D_{pix}$=Pixel Size f=f number
FOV=field of view
R=range FIGS. 10 and 11 depict simplified graphical representations of results derived from equation (1). These graphical plots show the SNR versus Range for 7.5, 10, and 15 degree IFOV for both mortar and 200 W/sr source ejector flashes, respectively, based on radiant intensities of 1000 W/sr and 200 W/sr respectively with 3 mm size pixels. More specifically, FIG. 10 shows a graphical representation of SNR 1020 as a function of FOV for mortar threats based on a 1000 W/sr radiant energy, and a threshold detection level of 3. FIG. 11 shows a graphical representation of SNR 1120 as a function of FOV for 200 W/sr source threats and a threshold detection level of 3. Assuming a minimum detection SNR of 3, the IFOV can be about 10 degrees. From this, several detector configurations can be analyzed, and a final desired configuration can be chosen. Some example implementations are further described below.

Flash Detector Array

Figure 12:
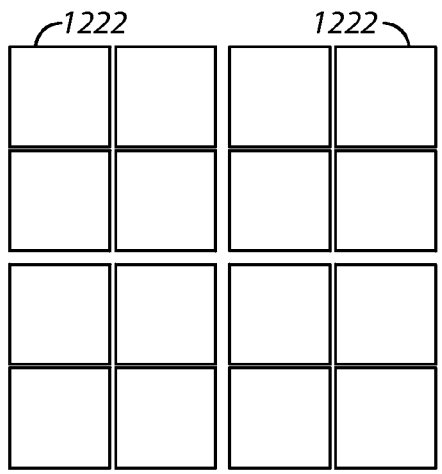
FIG. 12 shows a monolithic detector array with sixteen detectors.
Figure 13:
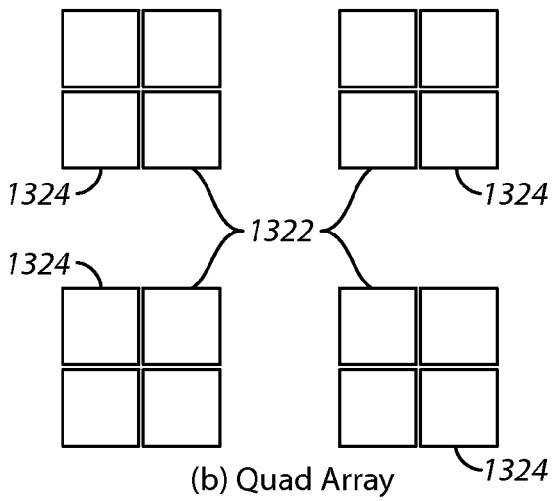
FIG. 13 shows a quad array of four cooperated quad arrays, each with four detectors.

Various detectors and/or configurations can be employed with at least some embodiments to accurately detect flashes. Based on a link budget analysis described fully below, various configurations of detectors can be utilized. FIGS. 12 and 13 depict possible configurations for the detectors. Specifically, FIG. 12 shows a monolithic detector array 1220 with sixteen detectors 1222, and FIG. 13 shows a quad array 1320 of four cooperated quad arrays 1322, each with four detectors 1324. The monolithic array 1220 is a multi-element detector having low noise and typically using one optic. The quad array 1320 can be configured such that a single optic is used for each quad detector 1322. In some implementations, the quad array could also be broken into individual detectors but likely would increase the number of optical elements even further (e.g., 16) to meet the desired SNR and FOV, which also may increase the size and volume of the entire sensors package.

The monolithic array 1220 is relatively simple to employ. It utilizes a single optic and the noise is significantly reduced due to the small individual detector size. The four individual quad arrays 1324 provide some benefits. The noise is essentially the same as the monolithic array 1220, but typically uses four optical elements due to the distance (some time referred to as "dead space") between detectors. Another configuration is an array of single elements (not shown) that employs, for example, sixteen optical elements, and is a viable solution as it meets the desired SNR. Table 1 below summarizes three potential detector alternatives.

TABLE 1

Examples of Three Detector Alternatives

| Type | Array Size | Number of Optics | Detector Size | IFOV | FOV | Optic | SNR |
|---|---|---|---|---|---|---|---|
| Monolithic | 16 × 16 | 1 | 2 mm | 4.5 Degrees | 36 Degrees | 1" | 9 |
| Single | 4 × 4 | 16 | 4 mm | 4.5 Degrees | 36 Degrees | 1" | 5 |
| Quad | 2 × 2 × 4 | 4 | 2 mm | 4.5 Degrees | 36 Degrees | 1" | 9 |

The SNR can be based on 200 W/sr source radiant intensity at 4 km. In some embodiments, the monolithic array 1220 is desired due to its simplicity. The 4×4 quad array 1320 can be employed in some embodiments, typically utilizing commercial-off-the-shelf (COTS) components and thus is a more likely choice for some implementations. Another viable option for some embodiments is a single element array, but this increases the number of optics and potentially the size and volume of the detection system 130. Another consideration, for some embodiments, can include coupling to a sterling cooler or other relevant cooler.

Imaging System

The specifications for a flash detection camera implemented in the imaging system 134 according to some embodiments are based at least in part on the FOV and the desired ground sample distance (GSD) (this can in part determines the number of pixels). A 30° FOV at 4 km represents approximately 2100 m on the ground. With a 320×256 array, this represents a GSD of about 6.5 m on the ground. A 640×512 array maps to a GSD of just larger than 3 m. For targeting accuracy, and since larger arrays are readily available COTS items, a 640×512 array is utilized in some embodiments. Other specifications of the camera can include external triggering, with a readout rate of about at least 30 Hz, a minimum of 1 ms between triggered frames, controllable integration times, digital readout and/or low noise. An example of a close fit to these specifications is the Indigo Phoenix 640×512 InSb array, which can include a camera controller that often has a size that is similar to the camera that can be placed a relatively significant distance away from the camera.

Signal Processing According to Some Embodiments

Figure 14:
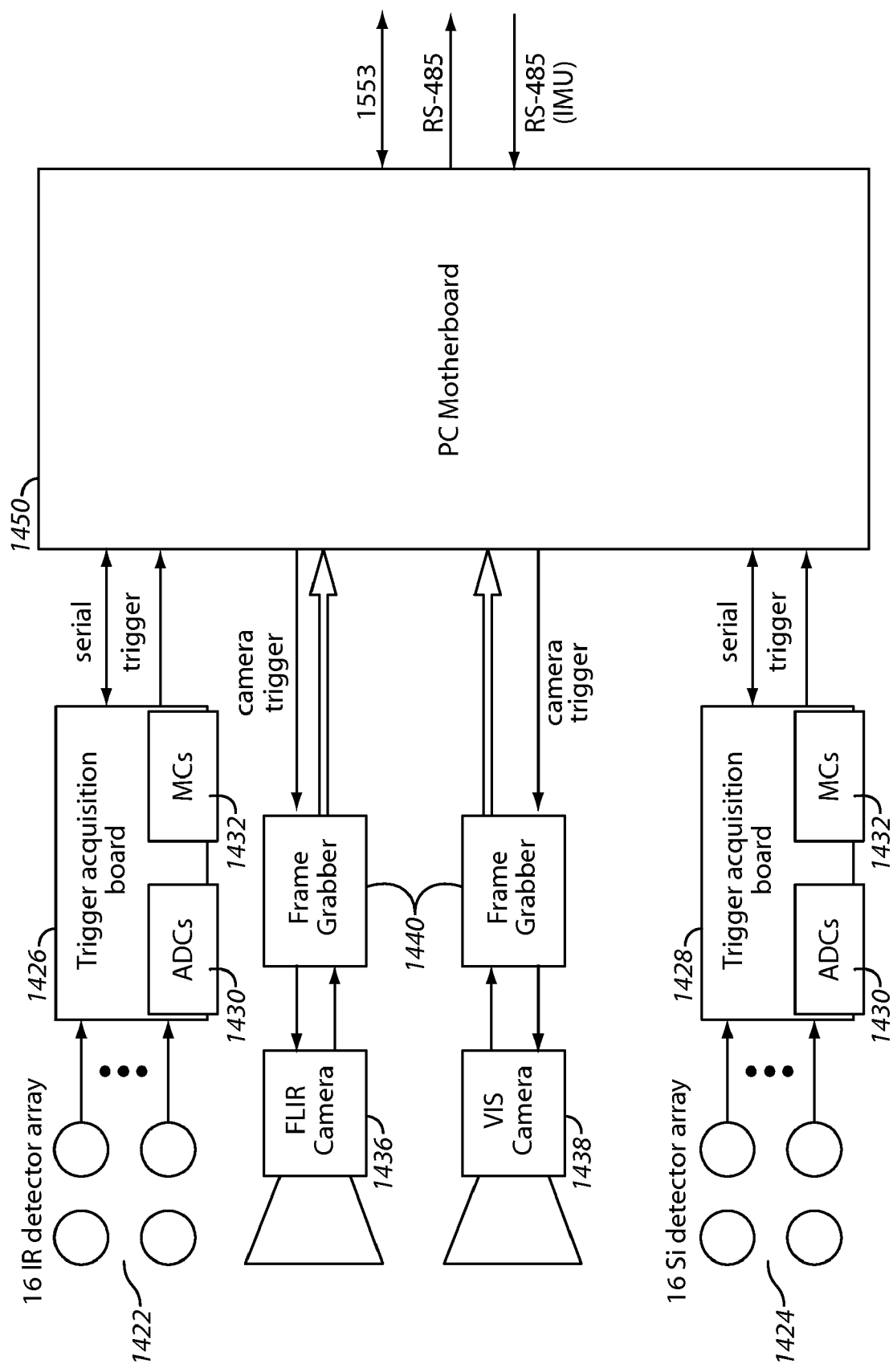
FIG. 14 shows simplified block diagram of an example signal processing for the flash detection system according to some embodiments.

FIG. 14 shows simplified block diagram of the signal processing for the flash detection system 120 according to some embodiments. Two detectors 1422, 1424 detect a flash and generate signals representative of the detected flash that are forwarded trigger acquisition boards 1426, 1428. Each trigger acquisition board includes an analog to digital converter 1430 and a micro-controller or processor 1432. The trigger acquisition boards and/or controllers capture signals from the detector arrays 1422, 1424, discriminate the signal against false positives, and send triggers to one or more flash detection cameras 1436, 1438 upon a positive event and forwards the data to the motherboard 1450. For example, the micro-controllers can process the digitized signals to determine, in some embodiments, whether the detected signal levels are above predetermined thresholds. Some embodiments further provide for additional processing in performing spectral evaluation of the two detected signals to determine a spectral ratio of the detected signals. Additionally or alternatively, in some implementations, only a single trigger acquisition board is included and received signals from both detectors 1422, 1424. As described above, in some implementations, one of the detectors 1422 can be configured to detect a first wavelength band (e.g., an IR band) while the other detector 1424 can detect a different band (e.g., visible band). When it is determined that the flash is a flash of interest, the micro-controllers can transmit triggers for activation of one or more cameras 1436, 1438 (e.g., a FLIR camera and/or a visible light camera). In some embodiments, the data rates are relatively low, for example, on the order of 10 Mb/s.

The trigger causes the cameras 1436, 1438 to capture an event image including the flash event and a background image. In some embodiments, one or more image or frame grabbers 1440 can be coupled with the cameras to retrieve the images. Once the flash is verified as a flash of interest the flash and background images are collected and the images are forwarded for processing (e.g., background subtracted), and a geo-location algorithm is applied to locate the position of the flash.

In implementing the spectral analysis, a spectral trigger can be accomplished through a two-level trigger system. The first level monitors each individual photo-detector for a valid trigger level. If a trigger is received, the second level generates a trigger based on spectral temperature.

FIGS. 15 and 16 show examples of hardware options to accomplish the first level trigger and data acquisition. FIG. 15 shows a micro-controller acquisition and trigger circuit 1426 (or 1428). One or more controllers 1522 can be implemented, for example using 8051 controllers or other such controllers. The acquisition and trigger circuit couples with the detector 1422 and/or 1424 (such as a sixteen (16) detector array). An array of sixteen controllers 1522 are included and each couple with one of the detectors 1524 of the detector array. In some implementations, each of the controllers includes an ADC. A final controller 1530 couples with each of the sixteen controllers 1622 and provides a comparison data, control and outputting data off the board 1426.

FIG. 16 shows an FPGA based trigger and acquisition system 1426 (or 1428) according to some embodiments. The board includes sixteen ADCs 1622, each coupled with one of the sixteen detectors of the array 1422 (or 1424). Each ADC has a single analog input 1624 coupled with one of the detectors 1524 of the detector array, and twelve digital data outputs 1626. The ADCs are coupled with an FPGA 1632 that receives twelve (12) bit serial or parallel digital ADC data, and processes the data as described above and outputs the data to the motherboard 1450.

Experimental Validation of Concept

Detectors: Description and Performance

In some embodiments, the choice of detectors used in the validation of the flash detection is based on the dual wavelength bands, for example bands: 400-1100 nm and 3-5 μm. The detectors, in some embodiments, have about a 10 kHz band width, a large area to fulfill a desired wide FOV, low noise and AC coupling. In a below example, the bandwidth is based on the temporal profile of small arms and mortar flashes, which typically range from about 1-10 ms in duration (however, shorter or longer durations can be detected). The low noise is based on the link budget calculation of long range (e.g., >4 km) sensing of flashes. The AC coupling attempts, at least in part, to eliminate effects of DC signals, such as solar background.

For some embodiments, the choice for the visible range of wavelengths is silicon (Si). For example, the Thor Labs PDA 520, a 10×10 mm, low noise Si pin diode with built in preamplifier was chosen for some implementations. For the 3-5 μm band, a liquid nitrogen (LN) cooled Indium Antimonide (InSb) detector was chosen for some implementations. For example, the Judson J10D-M204-RO2M-60, a 2 mm InSb detector, has very low noise and very high responsivity for the 3-5 μm range. Typically, the detector(s) are implemented using commercially available off the shelf detectors such as commercially available Si and InSb detectors, with specifications for the detectors being readily available from manufacturers.

Link Budget Definition

The link budget defines some system parameters according to some embodiments. Many of these parameters can be calculated and/or determined to within less than a few percent error. Table 2 below identifies at least some of the parameters that define an example link budget. The link budget parameters and the calculation of at least some of the parameters are described further below. One factor in the link budget is the definition of the source power and the collection fraction. The following defines the source power in W/sr, and the collection fraction as steradians (area/range$^2$). When the collected power is calculated, the solid angle drops out and the resultant is total power. With the link budget validated, it is used to estimate the power of an unknown source based for example on a measured signal, range and other basic system parameters. Further definitions and examples regarding the link budget and the parameters of the link budget are described below.

TABLE 2

Example of Detailed Flash Detection Link Budget Table

| Title | Title |
|---|---|
| BB Calibration of LN2 InSb | LN Cooled P7751-02 |
| Detector | InSb |
| Det. Size (mm) | 2.0 |
| Wavelength (Microns) | 4 |
| Spectral Width of Filter (μm) | 1.87 |
| Source Power [Watts/(sr* μm)] | 1.01 |
| Energy/Photon (J) | 4.96E−20 |
| Slant Range (m) | 25 |
| FOV (m) | 2.0 |
| Frame FOV (mrad) | 79.92 |
| Frame FOV (Degrees) | 4.58 |
| Telescope Aperture (m) | 0.023 |
| Eff. Focal Length (m) | 0.025 |
| Collection Fraction (sr) | 6.65E−07 |
| Detector D* (Lambda p, 1200, 1) | 2.07E+11 |
| NEP (W) | 5.07E−10 |
| Det. Response (A/W) | 3.00 |
| Load Resistor (Ohm) | 1070000 |
| Albedo | 1 |
| Fudge Factor | 0.408163265 |
| System Transmission | 0.777924 |
| Quantum Efficiency | 0.9 |
| Det. Integration Time (Sec.) | 3.64E−06 |
| Signal (pe) | 3.43E+3007 |
| Signal (Watts) | 5.20E−07 |
| Signal (Volts) | 6.82E−01 |
| SNR (Signal to Det. Noise) | 1027.095 |
| SNR (pe and det. Noise) | 1011.67 |

Field Experiments

Numerous field experiments were performed validating the flash detection, image capture, geo-location identification and/or classification as described above and further below. Further verification was obtained for at least 1) a visible strobe and visible radiometric collection of an M 16A2 flash event; 2) mortar flash detection and to validate the two-frame image subtraction method; 3) four (4) small firearms test were used to validate the performance of both Si and InSb detectors and an image capture was triggered directly from the detectors; 4) long range (e.g., <4 km) spectral and temporal measurements of charge 2 and 4 mortars; and 5) long range background measurements of solar glint.

Strobe and M-16 Flash Detection

A silicon (Si) photo detector, 4 inch telescope detector and a CCD camera with a Kodak KAI-4000M sensor were used to detect a survival strobe at 1.2 km and an M-16A2 rifle firing standard NATO round. These tests were used to validate flash detection concepts of at least some embodiments.

Figure 17:
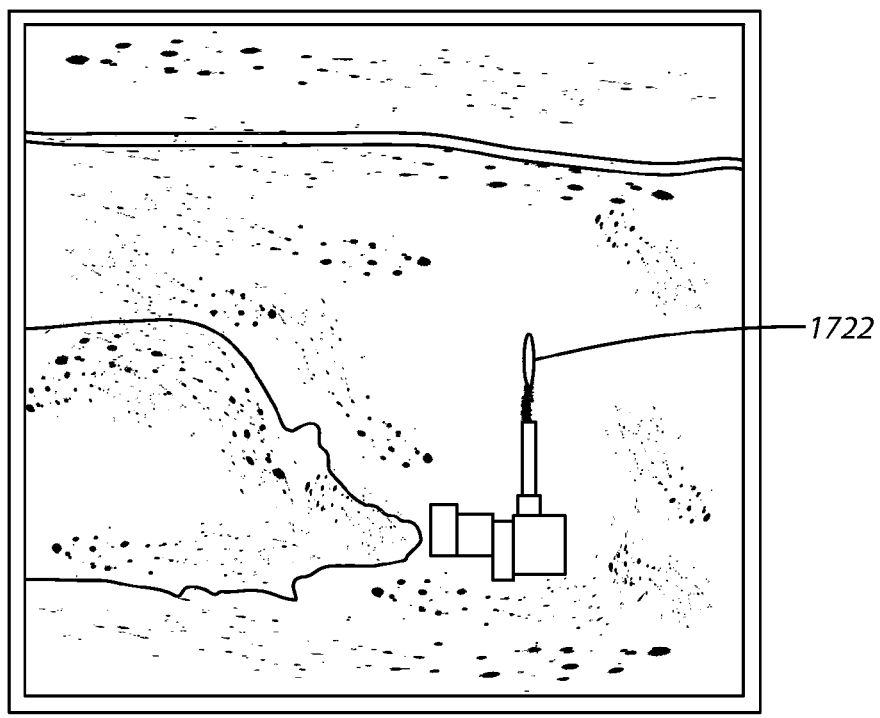
FIG. 17 shows a first image that includes a flash event based on the mortar flash.
Figure 18:
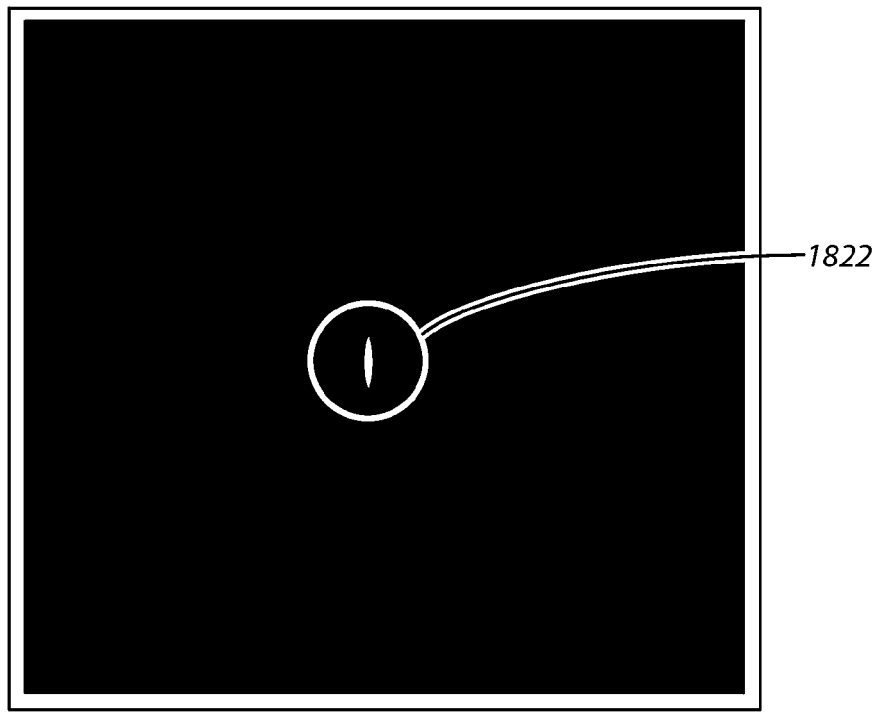
FIG. 18 shows a difference image after the second background image is subtracted from the first image of FIG. 17.

Mortar Flash Detection and Validation of Two-Frame Image Subtraction Method According to Some Embodiments A single camera (triggered by a Si diode at close range) was used to capture a first illuminated image and a second background image for change detection. The camera was a CCD camera with KAI-4000M sensor that was externally triggered by a standard COTS Si pin diode. FIG. 17 shows a first image 1720 that includes a flash event 1722 based on the mortar flash with a 5 ms exposure and/or integration. FIG. 18 shows a difference image 1820 after the second background image is subtracted from the first image 1720, where the second image was also a 5 ms exposure. The background image was taken 250 ms after the flash, so there are substantial differences in the images that typically would not be present had the images been taken closer in time proximity, such as 100 ms or less, less than 100 ms after the flash, or other time periods. The flash 1822 highlighted by the circle is clearly seen in the second difference image 1820.

First of Small Arms Fire Test

Figure 19:
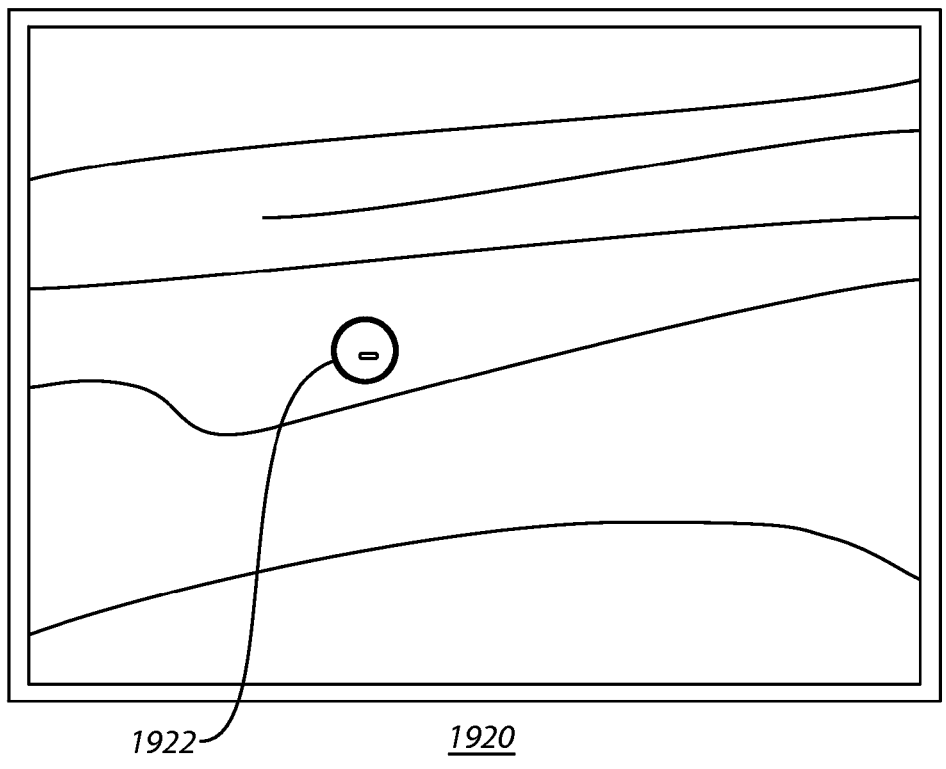
FIG. 19 shows a first image that includes a 9 mm flash event at about 180 m with a 30 degree FOV indicated by a circle based on the small arms fire.
Figure 20:
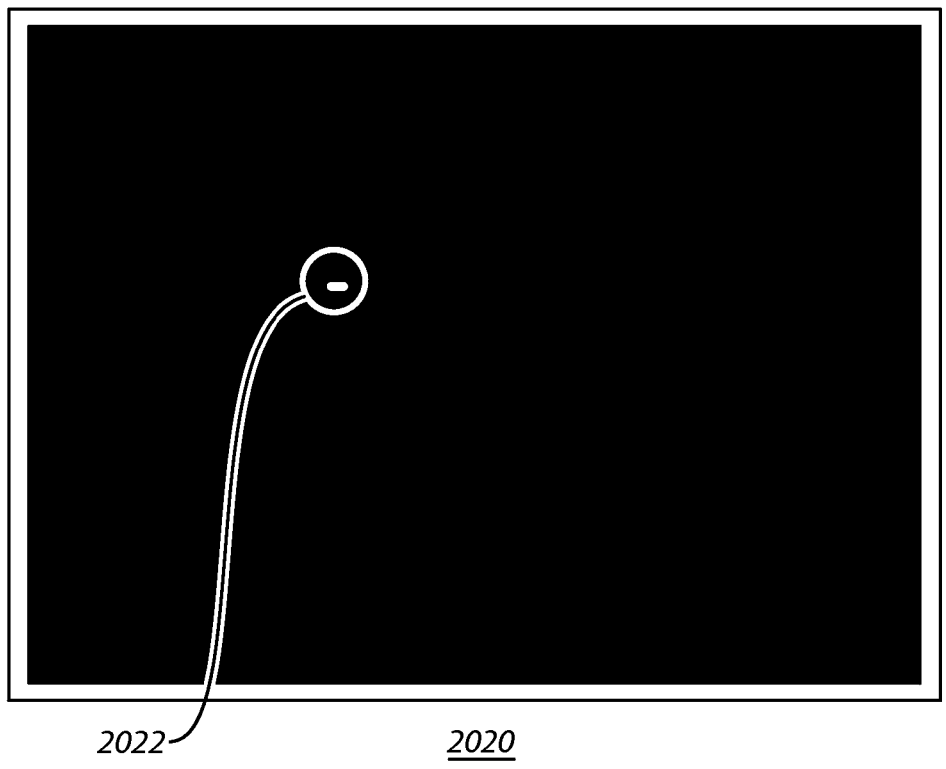
FIG. 20 shows a difference image after a second background image is subtracted from the first image of FIG. 19.

A small arms fire test captured flash events from small arms fire using an embodiment of a dual image difference method. A 9 mm and 0.30-06 were fired from about 180 m with the camera in free running mode (no external trigger). The detector scheme was not employed during these first tests. FIG. 19 shows a first image 1920 that includes a 9 mm flash event 1922 at about 180 m with a 30 degree FOV indicated by a circle based on the small arms fire. FIG. 20 shows a difference image 2020 after a second background image is subtracted from the first image 1920, with the flash 2022 being visible in the difference image 2020.

A Second Small Arms Fire Test

A second small arms fire test captured flash events of small arms (9 mm and 3006) with a suite of sensors determining a relative magnitude of flash signals as a function of wavelength. The wavelength bands that were measured included 250-350 nm, 400-1000 nm, and 3-5 μm. The first band was measured with a solar blind (filtered) Si diode and a solar blind photo-multiplier tube (PMT), the second band with a standard, unfiltered Si diode, and the third band with a TEC cooled InSb detector. Results varied, but the trend of the majority of data showed that there was significant power in the 3-5 μm band. Based in part on these test results a LN cooled, low noise, high responsivity detector was employed in some embodiments and some future testing.

A Third Small Arms Fire Test

The third small arms fire test showed that the LN2 cooled detector, (that employed precision pointing gimbal) can be used to collect some flash event data (e.g., mortar flash data) at a distance of about 4 km. This can be based, for example, on an extrapolation of a calibrated link budget, and from data collected from a 3006 and a 9 mm muzzle flash. A LN2 cooled 2 mm InSb detected was employed using a 1 inch f#1 lens and a 3-5 μm band pass filter. A low noise amplifier was additionally used that was AC coupled and having a gain of about 100,000. Ranges varying from 186 m out to nearly 560 meters were measured. Based on a calibrated link budget, the 9 mm has a power density of about 10 W/sr and the 3006 has a power of 30 W/sr. When plotted against a theoretical $1/R^2$ signal drop off with distance, the collected data matched very well with the theoretical.

As a secondary objective for the third small arms fire testing data collection, it was shown that the external trigger from an oscilloscope could be used to trigger a camera to capture the event. A Sensors Unlimited (SU) camera, an InGaAs 640×512 array, was triggered via an external trigger of a Lecroy fast oscilloscope. A computer with a Camera Link frame grabber was used to control the SU camera and a Stanford Research Systems delay generator used to control the integration time of the camera (where in this instance integration time is equal to input pulse width).

Figure 21:
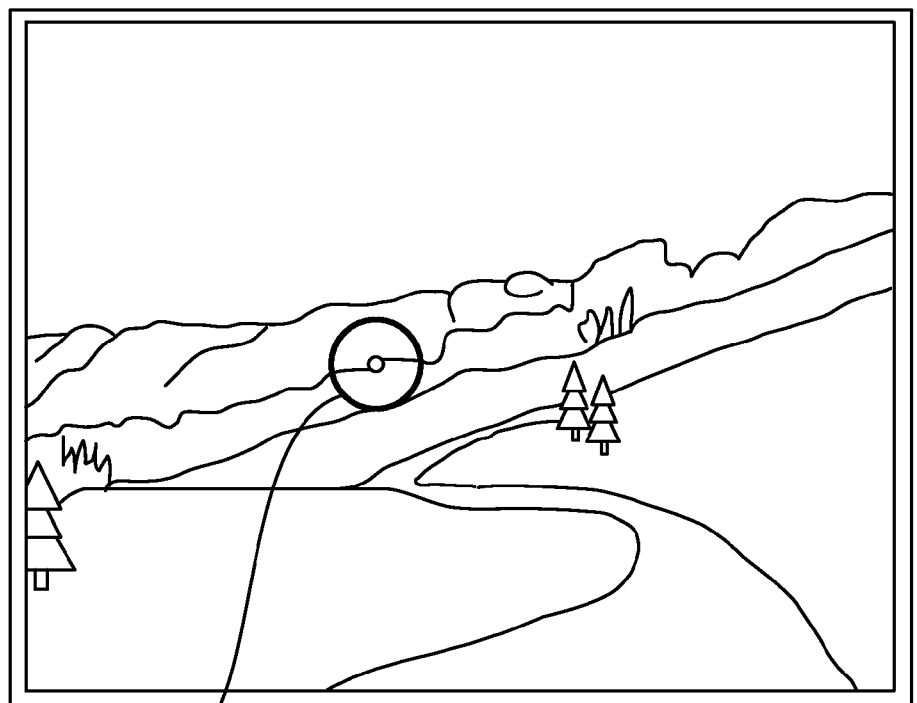
FIG. 21 shows a first image that includes a flash event.
Figure 22:
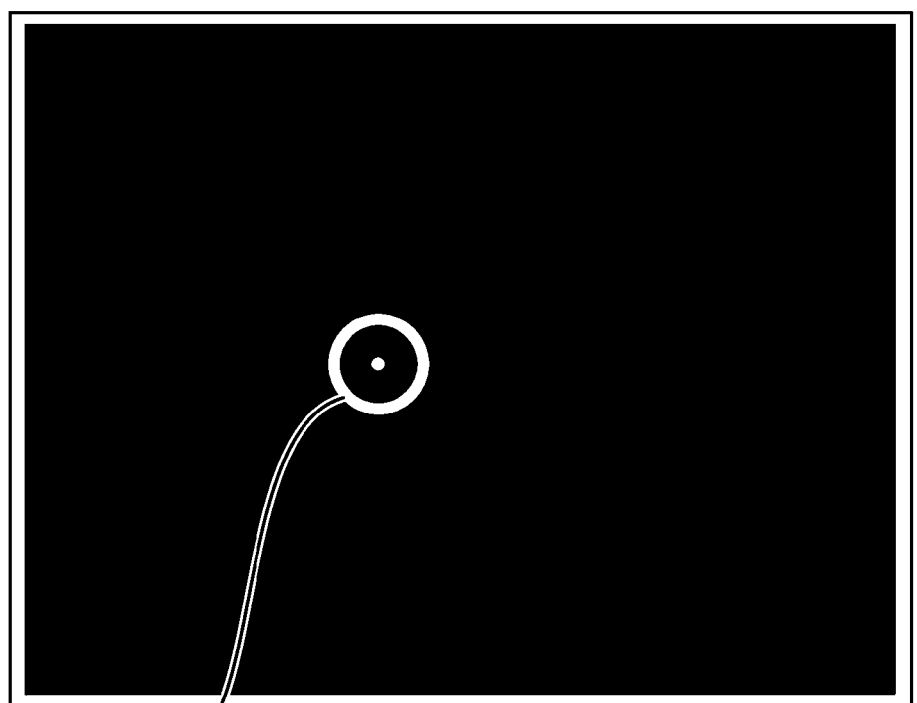
FIG. 22 shows a difference image after a second background image is subtracted from the first image of FIG. 21.

FIG. 21 shows a first image 2120 that includes a flash event 2122. FIG. 22 shows a difference image 2220 after a second background image is subtracted from the first image 2120. The flash event 2222 is shown in the difference image.

Long Range (>4 km) Spectral and Temporal Measurements of Charge 2 and 4 Mortars

Data was collected from charge 2 mortar flashes from 600 m and 4 km using an LN2 cooled InSb detector with a 1" collection optic and a 4.5 degree FOV. There were limited data points collected as there were 8 total events performed. The data collected from 600 m shows a high level of structure. Data collected from 4 km yielded a SNR of about 2.5. Further processing of the signals, namely high frequency filtering, can be used to increase the SNR. The calibrated link budget was used to calculate the power density of the charge 2 source, which yielded a value of about 935 W/sr. In these tests, the detector employed was a LN2 cooled 2 mm InSb using a 1" f#1 lens and a 3-5 μm band pass filter. A low noise amplifier was also used that was AC coupled and had a gain of about 10E5. The amplifier was AC coupled and high impedance connected to an oscilloscope, where a single shot mode was used to collect and save flash event data.

As introduced above, data was collected from two different ranges: 600 m and 4 km. Data was collected from a total of 8 shots from an 80 mm mortar. Time between shots was approximately one hour. Communication with the crew in charge of firing the mortars allowed the experiment to be ready with the one-minute countdown that occurred before each shot. According to the calibrated link budget, data from the 600 m shots demonstrated that the mortar flash power density is approximately 935 W/sr. Similarly, according to the calibrated link budget, data from the 4 km shots demonstrated that the mortar flash power density is approximately 860 W/sr, with a slightly different viewing angle than from 600 m.

Long Range Background Measurements of Solar Glint

Background glint data was collected from 4.5 km. In conducting measurements the only glint sufficient to trigger the detector at the time was from the fuselage of a parked helicopter. It was a constant, flashing signal while the sun was in the correct position, and had a magnitude of 6 mV with a noise level of 3 mV. According to the calibrated link budget model, given that there are about $20/m^2$ Watts of power within the 3-5 μm spectrum and the helicopter fuselage area is about 6-10 $m^2$, a signal from 3.5 to 8.5 mV should have been measured. A city skyline was also measured (at a range of about 7 km), but yielded no triggers. Also, a Si detector was setup to take data but received no triggers (the signal was noise).

Link Budget

As described above, the link budget at least in part defines some system parameters according to some embodiments. Below describes an example link budget calculation for flash detection according to some embodiments. The first part calculates the link budget for a FLIR camera that was used in a field test to measure a mortar blast. In this test, a single camera pixel was saturated. The link budget is used to estimate the minimum optical power associated with the blast that could saturate the camera. The second part calculates link budgets for various detectors using the power obtained from the camera test.

Part 1: FLIR Camera Test

An Indigo Phoenix 640×512 camera was used in a field test of a mortar flash where one pixel was saturated. The minimum source power to saturate that pixel is calculated. Letting S be the source strength in (W/um/$m^2$), t the integration time of the camera in seconds, BW the spectral bandwidth of the camera in microns, and $d_s$ the source size in m. The energy of the source can then be calculated as:

$E(\text{Joules}) = S t B W d_s^2.$

When the light is collected with a lens of diameter $d_l$(m) and focal length Fl(m) at a range R(m), the collection fraction (Cf) is:

$Cf = (d_l/R)2/16,$ and the image size is:

$d_i = d_s/(R/Fl - 1).$

The camera is characterized by a pixel size $d_p(m)$, read noise n(pe=photoelectrons), gain g(counts/pe), and quantum efficiency qe. The number of pixels illuminated by the source is:

$$n_p = (d_i/d_p)^2$$

The wavelength of light is w(um) and the energy/photon is hv (Joules)=1.6e-19*1.24/w. The transmission of the system is given by t.

The number of pe/pixel is then calculated from:

$$pe = E/hv \, Cf \, tqe/n_p.$$

The signal-to-noise ratio can be calculated by:

$$SNR = pe/(n^2 + pe)^{0.5},$$

and the signal (counts)=g pe.

Table 3 below shows these parameters with approximate values from field testing for a link budget using a Phoenix camera saturated pixel. The source power was increased until the well capacity of the camera (1.1e7) was exceeded. The quantum efficiency and the camera gain are estimates. Other camera information was obtained from the camera data sheet.

TABLE 3

| Link-budget for Phoenix camera saturated pixel | |
|---|---|
| source (w/um/m²) | 2300 |
| integration time (sec) | 0.001 |
| spectral bandwidth (um) | 2 |
| wavelength (um) | 4 |
| range (m) | 5000 |
| source size (m) | 1 |
| lens dia (m) | 0.01 |
| eff. Focal length (m) | 0.025 |
| energy/photon (joules) | 4.96E−20 |
| pixel size (m) | 2.50E−05 |
| camera read noise (pe) | 500 |
| camera gain (cnt/pe) | 0.0017 |
| quantum efficiency | 0.9 |
| system transmission | 0.53 |
| source energy (joules) | 4.6 |
| collection fraction | 2.5E−13 |
| image size (m) | 5.00E−06 |
| # of pixels | 0.20 |
| # of pixels (≧1) | 1 |
| pe/pixel | 1.11E+07 |
| pe/pe noise | 3.33E+03 |
| SNR | 3.29E+03 |
| signal (counts) | 1.88E+04 |
| solar flux (w/m2/um) | 15 |
| albedo | 0.3 |
| solar signal (pe/pixel) | 5.41E+05 |
| sig/solar | 20.44 |

By adjusting the source power until the well depth of the camera is reached, the minimum source power to saturate a pixel can be determined. In a similar manner, the signal from solar illumination can be obtained. Table 3 shows the ratio of the source to solar is about 20 in this case.

Part 2: Various Detector Link-Budgets

A similar analysis can be done to evaluate various detector performances when viewing the source calculated in Part 1 above. In this analysis, the FOV of detectors is calculated using the detector diameter $d_{det}(m)$ from:

$$FOV(m) = d_{det}/(R/Fl - 1).$$

The noise-equivalent-power (NEP) for detectors is obtained from data sheets or calculated from the published $D^*(cm, Hz^{0.5}/W)$ from:

$$NEP = d_{det}(cm)(1/t)^{0.5}/D^*.$$

The actual signal level V(volts) can be calculated from the detector sensitivity A(A/W), the detected power SD(W), and the load resistance RL(ohms) from:

$$V = SDARL.$$

Several different detectors and sizes were analyzed and the results are shown in Table 4 below. For these calculations the range is 5000 m, and a 25 mm diameter F/1 lens is used. A larger lens will increase the detected signal but decrease the FOV.

Three different SWIR InSb detectors were analyzed. The P6606-210 is a TE cooled, 1 mm InSb detector. Since it operates at −40 C, the noise level is not as good as the LN cooled detectors and a SNR of 3.2 is obtained. This small detector has the narrowest FOV and hence the lowest solar signal.

The P7751-02 and the P5968-300 are both larger (2 and 3 mm respectively) LN cooled (−196 C) detectors. As shown in Table 4, the lower operating temperature greatly improves the SNR. The larger detector has greater noise and a reduced SNR compared to the 2 mm detector. However, the 3 mm detector has a greater FOV, up to 6.88 degrees compared to 4.58 degrees for the 2 mm detector.

Detectors in the near IR and the UV were also analyzed. The silicon detector is used at 1.05 um and since the source power is unknown, it was adjusted to give a SNR about 1. The source power for the ultraviolet detectors was also adjusted for a SNR of 1.

TABLE 4

| Raptor View Link Budget calculations Oct. 15, 2004 9:54 Detector | Det110 Silicon | TE cooled P6606-210 InSb | LN cooled P7751-02 InSb | LN cooled P5968-300 InSb | UV SB-PMT-1 Ofil | SB-PMT R7154 |
|---|---|---|---|---|---|---|
| Det. size (mm) | 3.0 | 1.0 | 2.0 | 3.0 | 21.0 | 24.0 |
| Wavelength (microns) | 1.05 | 4 | 4 | 4 | 0.256 | 0.254 |
| spectral width of filter (um) | 0.25 | 2 | 2 | 2 | 0.03 | 0.03 |
| source power (watts/um) | 1.80 | 2300.00 | 2300.00 | 2300.00 | 0.13 | 0.13 |
| Energy/photon (J) | 1.8895E−19 | 4.96E−20 | 4.96E−20 | 4.96E−20 | 7.75E−19 | 7.811E−19 |
| Slant range (m) | 5000 | 5000 | 5000 | 5000 | 5000 | 5000 |
| FOV (m) | 600.0 | 200.0 | 400.0 | 600.0 | 4200.0 | 4800.0 |
| Frame FOV (mrad) | 120.00 | 40.00 | 80.00 | 120.00 | 840.00 | 960.00 |
| Frame FOV (degrees) | 6.88 | 2.29 | 4.58 | 6.88 | 48.13 | 55.00 |
| Telescope aperture (m) | 0.025 | 0.025 | 0.025 | 0.025 | 0.025 | 0.025 |
| obscuration (m) | 0 | 0 | 0 | 0 | 0 | 0 |
| Eff. Focal length (m) | 0.025 | 0.025 | 0.025 | 0.025 | 0.025 | 0.025 |

TABLE 4-continued

Link-budget calculations for various detectors

| Raptor View Link Budget calculations Oct. 15, 2004 9:54 Detector | Det110 Silicon | TE cooled P6606-210 InSb | LN cooled P7751-02 InSb | LN cooled P5968-300 InSb | UV SB-PMT-1 Ofil | SB-PMT R7154 |
|---|---|---|---|---|---|---|
| Collection fraction | 3.13E−12 | 3.13E−12 | 3.13E−12 | 3.13E−12 | 3.13E−12 | 3.13E−12 |
| Detector D*(lambda p, 1200, 1) | 2.50E+13 | 2.50E+09 | 2.00E+11 | 1.60E+11 | | |
| NEP (W) | 1.20E−12 | 4.00E−09 | 1.00E−10 | 1.88E−10 | 1.00E−15 | 1.00E−16 |
| Det. Response (A/W) | 0.50 | 0.50 | 150.00 | 2.50 | 3300.00 | 620000.00 |
| Load Resistor (Ohm) | 10000 | 100 | 1000000 | 10000 | 10000 | 10000 |
| Albedo | 0.3 | 0.3 | 0.3 | 1 | 1 | 1 |
| System transmission | 0.9 | 0.9 | 0.9 | 0.53 | 0.1 | 0.1 |
| Quantum efficiency | 0.6 | 0.6 | 0.6 | 0.9 | 1 | 0.3 |
| det. integration time (sec) | 0.0001 | 0.0001 | 0.0001 | 0.0001 | 0.0025 | 0.0025 |
| signal (pe) | 4.02E+02 | 1.57E+07 | 1.57E+07 | 1.38E+07 | 3.93E+00 | 1.17E+00 |
| signal (watts) | 1.27E−12 | 1.29E−08 | 1.29E−08 | 7.62E−09 | 1.22E−15 | 1.22E−15 |
| signal (volts) | 6.33E−09 | 6.47E−07 | 1.94E+00 | 1.90E−04 | 4.02E−08 | 7.56E−06 |
| SNR(signal to Det. noise) | 1.055 | 3.234 | 129.375 | 40.633 | 1.219 | 12.188 |
| SNR(pe and det. Noise) | 1.05 | 3.23 | 129.31 | 40.63 | 1.04 | 1.08 |
| Daylight operation | | | | | | |
| solar flux (w/m2/um) | 600 | 15 | 15 | 15 | 1E−10 | 0.0001 |
| solar signal (pe) | 1.45E+10 | 1.22E+09 | 4.90E+09 | 3.25E+10 | 5.33E−02 | 2.07E+04 |
| solar signal (watts) | 4.56E−05 | 1.01E−06 | 4.05E−06 | 1.79E−05 | 1.65E−17 | 2.16E−11 |
| Signal (volts) | 0.228 | 5.06E−05 | 6.07E+02 | 4.47E−01 | 5.46E−10 | 1.34E−01 |
| signal photon noise (volts) | 1.89E−06 | 1.45E−09 | 8.68E−03 | 2.48E−06 | 2.36E−09 | 9.30E−04 |
| SNR (source/solar noise) | 0.00 | 447.19 | 223.59 | 76.73 | 17.02 | 0.01 |

The result of initial calculation based on assumptions and/or tests with known flash source spectrums, correction factor(s) can be applied or inserted to account for incorrect assumptions based on actual measures and the differences from assumed ideal conditions (e.g., controllable flash event source with specific output) and measurements of actual flash events (e.g., muzzle flash events, explosion events and/or other such events).

Figure 23:
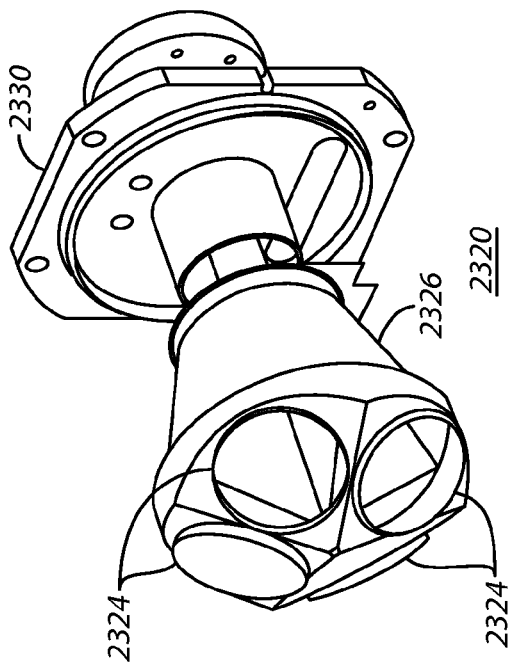
FIG. 23 depicts a perspective view of an example detector that can be utilized in the detector unit according to some embodiments.

As described above, many types of detectors can be employed in the detector unit 122 of the flash detection system 120. FIG. 23 depicts a perspective view of an example detector 2320 that can be utilized in the detector unit 122 according to some embodiments. The detector 2320 can be employed to detect a 200 W/sr 3-5 um, 10 ms or shorter duration flash at about a 5 km slant range. Further, the flash event can be sampled at about 10 kHz to provide classification based on temporal characteristics of the flash. The data provided from the detector can be utilized with data from one or more other detectors for multi-spectral information and/or evaluation to at least in part reduce false alarm rates. In some implementations, the detector 2320 can provide about a 30° field of view and about 100 m, and in some instances 50 m or better geo-location accuracy, assuming the sensor is being flown at about 15,000 ft above ground level. Table 5 defines some of the link budget parameters for the detector 2320 when incorporated into some embodiments of the detector system 120.

TABLE 4

Example Link Budget

| Aperture | 9.5 mm |
|---|---|
| Focal length | 18.8 mm |
| Cleartran lens | 70% transmission |
| 3-5 um filter | 90% transmission |
| Minimum source | 200 W/sr |
| Detector size | 9 mm$^2$ |
| D* at 60o FOV | $2 \times 10^{11}$ cm-Hz$^{1/2}$ W$^{-1}$ |
| Sensitivity | 2.5 A / W |
| Atmospheric | MODTRAN 1976 |

TABLE 4-continued

Example Link Budget

| Transmission | Standard atmosphere |
|---|---|
| IFOV | 7.5° |

Figure 25:
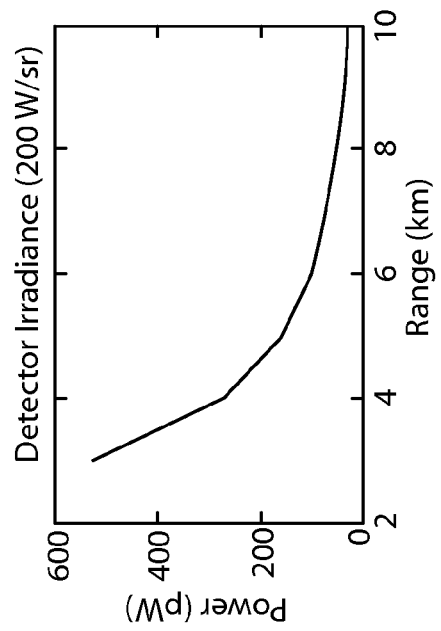
FIG. 25 depicts a graphical representation of detector irradiance versus range.
Figure 24:
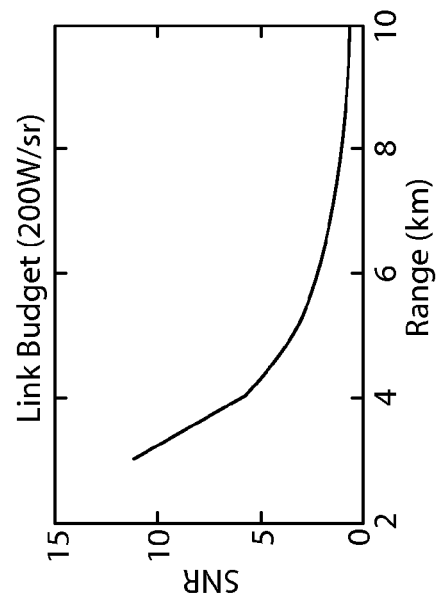
FIG. 24 depicts a graphical representation of a signal to detector noise versus range.

Based on a desired link budget, IR detector design parameters are arrived at as shown above in Table 4. The detector 2320 in this embodiment includes four quad arrays with each pixel being 3 mm×3 mm. FIG. 24 depicts a graphical representation 2420 of a signal to detector noise versus range. FIG. 25 depicts a graphical representation 2520 of detector irradiance versus range.

Referring back to FIG. 23, the detector includes four optics 2324 positioned within a housing 2326 that couples with a mounting plate 2330. The optics 2324 can be a single lens, multiple lenses, a telescope or other such optics. Further details of the detector 2320 are illustrated in FIGS. 26-31.

Figure 28:
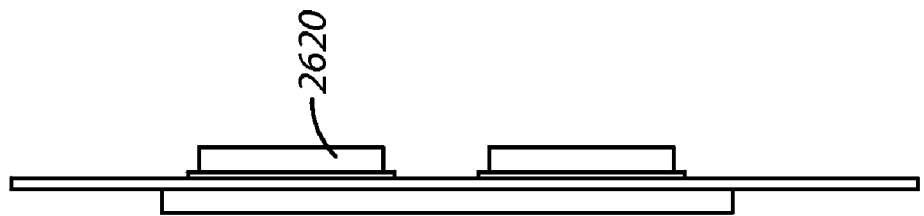
FIGS. 27 and 28 show overhead and cross-sectional views, respectively, of an IR detector motherboard that can be incorporated into the detector of FIG. 23.
Figure 27:
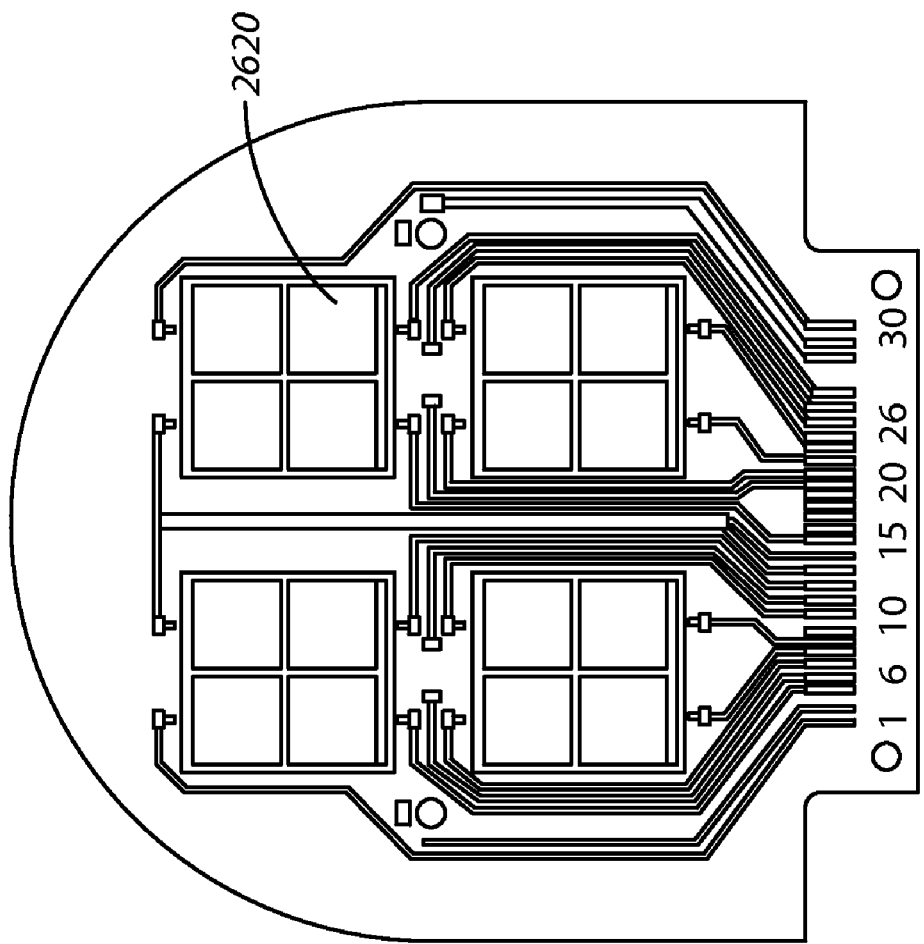
Figure 29:
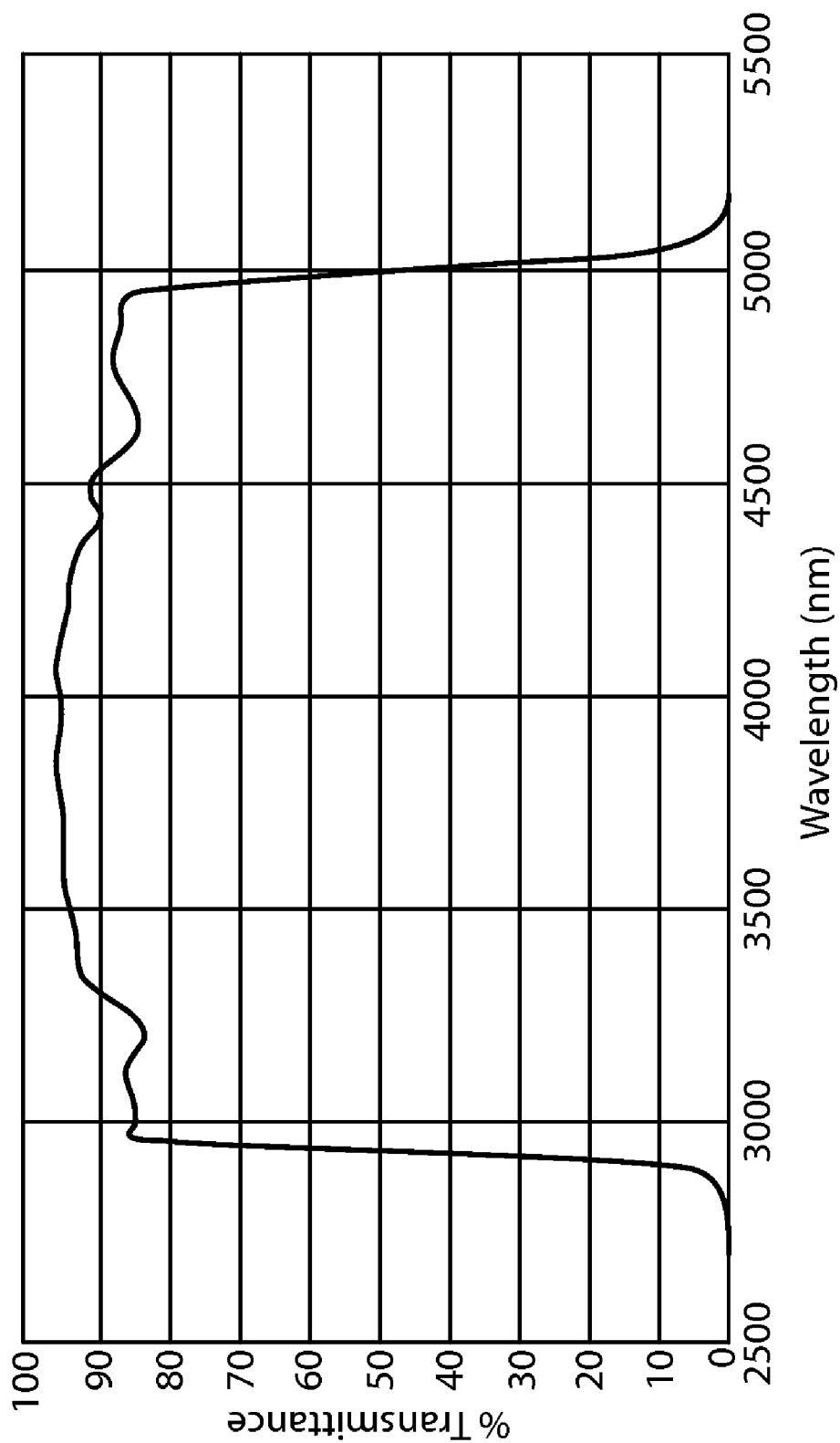
FIG. 29 shows a graphical representation of a cold filter transmission curve as detected through the IR detector motherboard of FIG. 27 according to some embodiments.

FIG. 26 depicts a scaled, partially transparent cross-sectional view of the detector 2320 and a cross-sectional view of the housing 2326. A quad array 2620 is shown positioned within the housing 2326. Each detector of the quad array aligns with one of the optics 2324 such that light is directed onto the detectors. FIGS. 27 and 28 show overhead and cross-sectional views, respectively, of an IR detector motherboard 2720 that can be incorporated into the detector 2320 and cooperated with the quad array. In some instances, the motherboard is implemented as a ceramic/molybdenum motherboard. FIG. 29 shows a graphical representation of a cold filter transmission curve 2920 as detected through the IR detector motherboard 2720 according to some embodiments.

Figure 30:
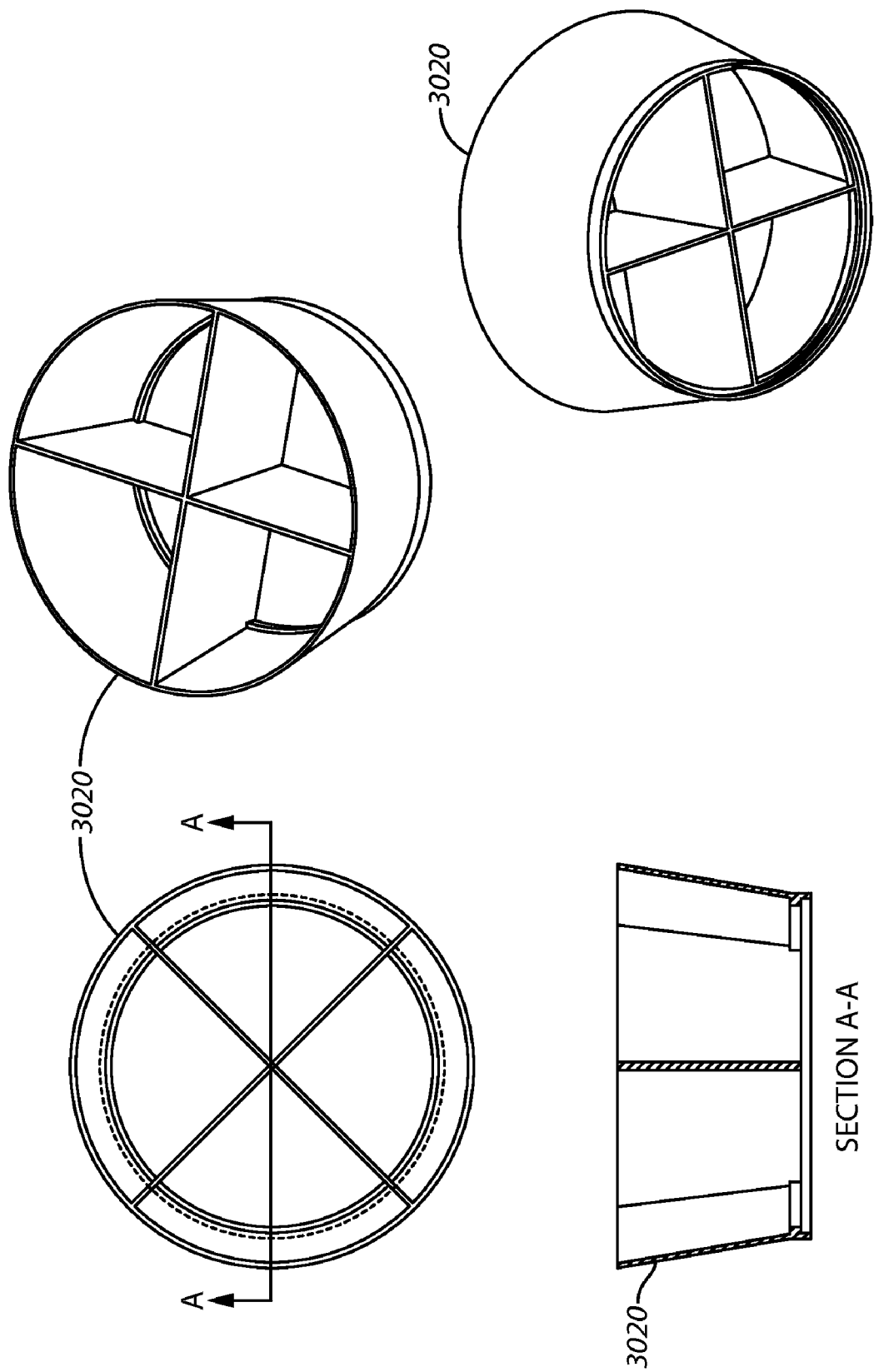
FIG. 30 shows a plane, upper perspective, lower perspective and cross-sectional views of a cruciform type cold shield according to some embodiments.
Figure 31:
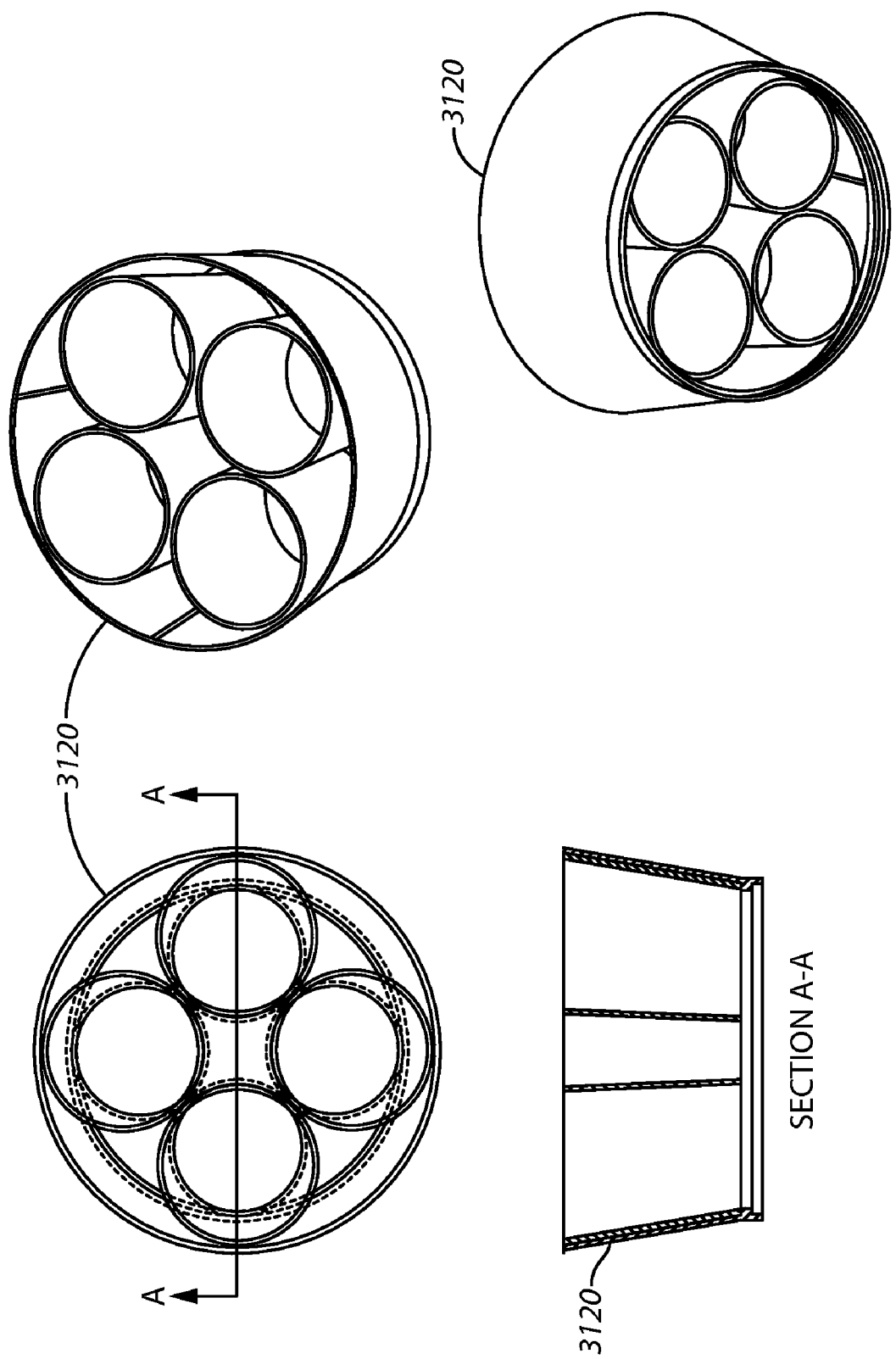
FIG. 31 shows a plane, upper perspective, lower perspective and cross-sectional views of a baffle type cold shield according to some embodiments.

FIG. 30 shows a plane, upper perspective, lower perspective and cross-sectional views of a cruciform type cold shield 3020 according to some embodiments. A top baffle plane has been removed for clarity. FIG. 31 shows a plane, upper perspective, lower perspective and cross-sectional views of a baffle type cold shield 3120 according to some embodiments, also with a top baffle plane removed for clarity. These cold shields or other cold shields can be utilized with the detector 2320.

Figure 32:
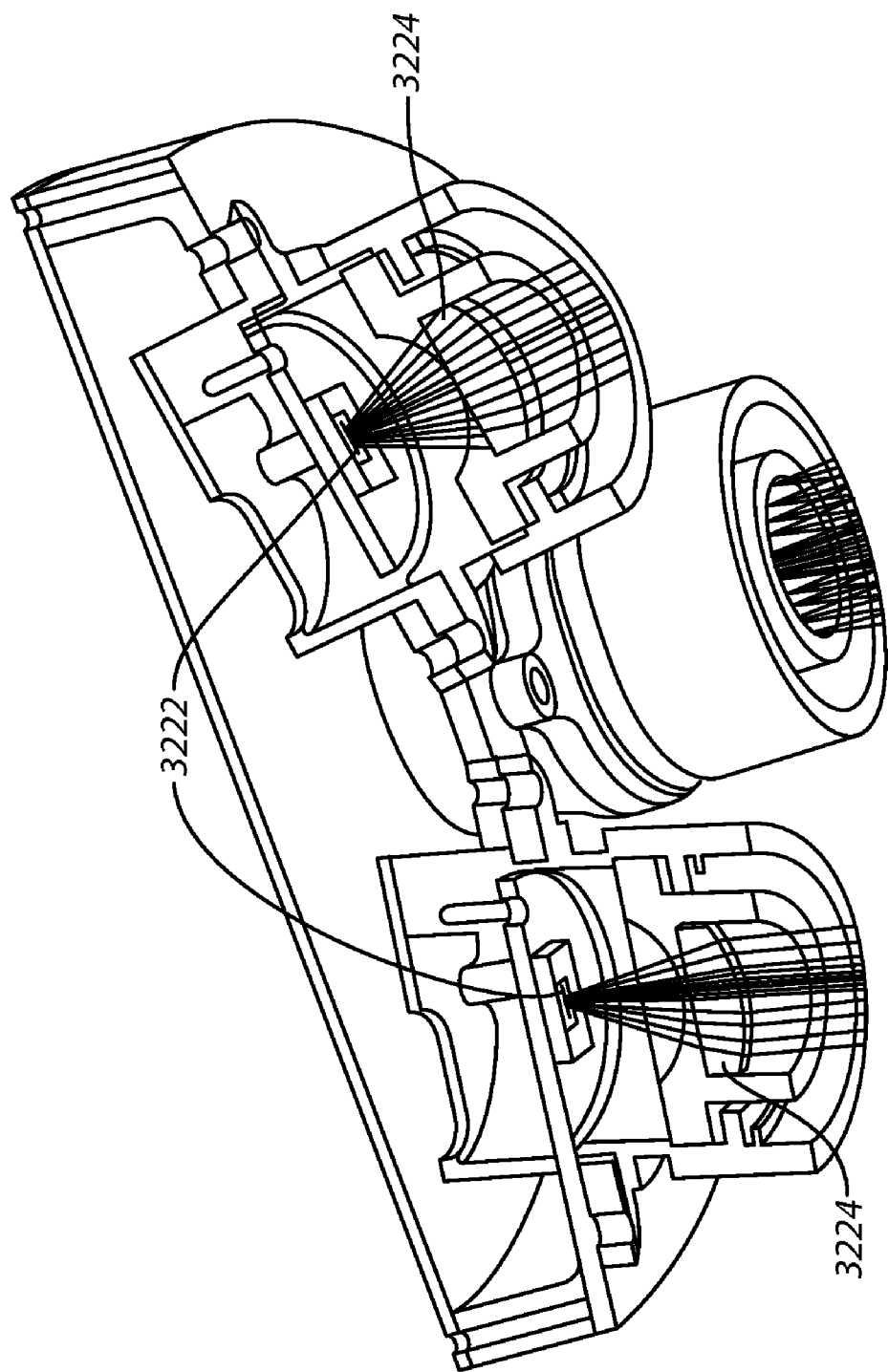
FIG. 32 depicts a cross-sectional perspective view of a detector that can be incorporated into some embodiments of the detector system of FIG. 1.
Figure 33:
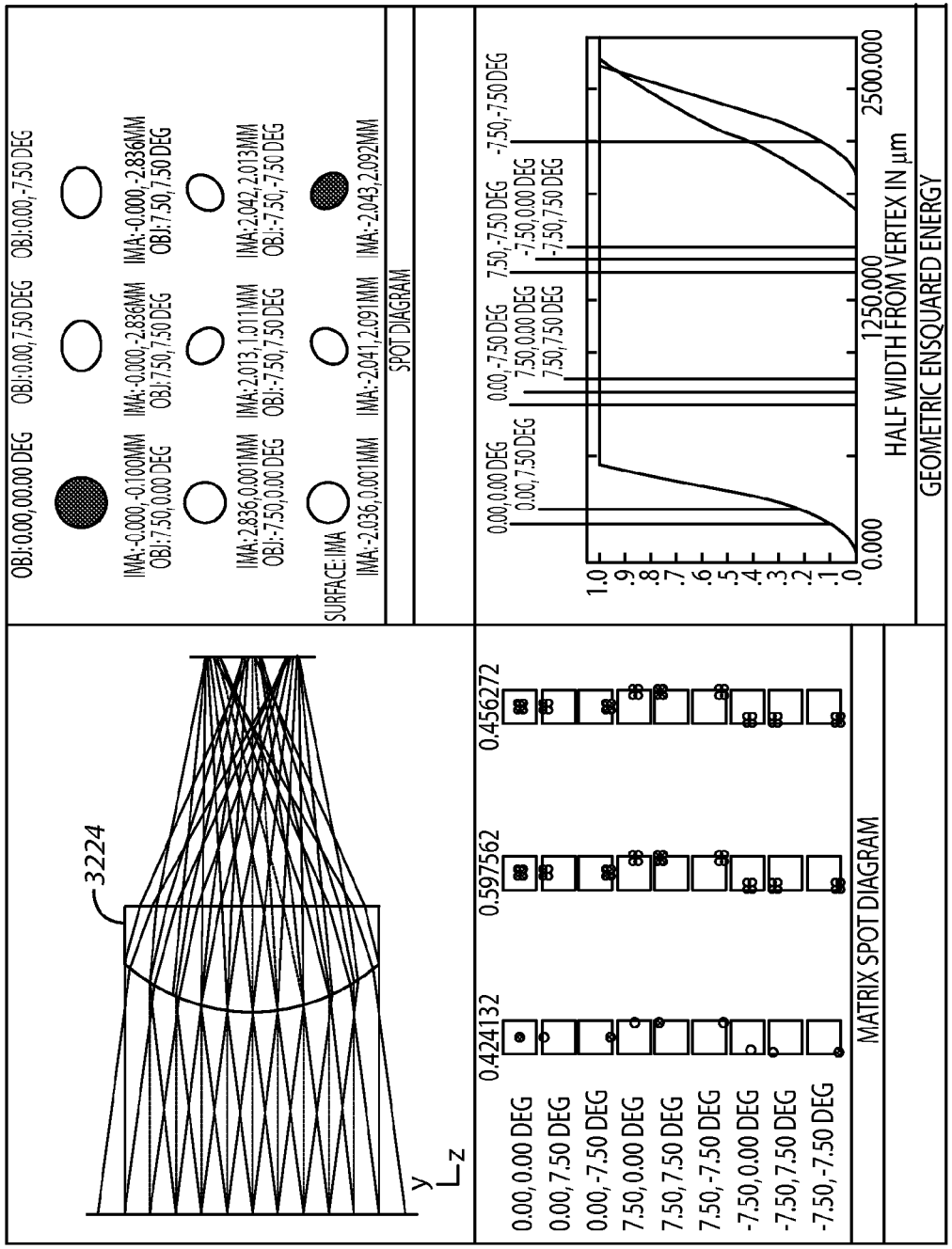
FIG. 33 shows an example of a matrix spot diagram for the optics of FIG. 32.
Figure 35:
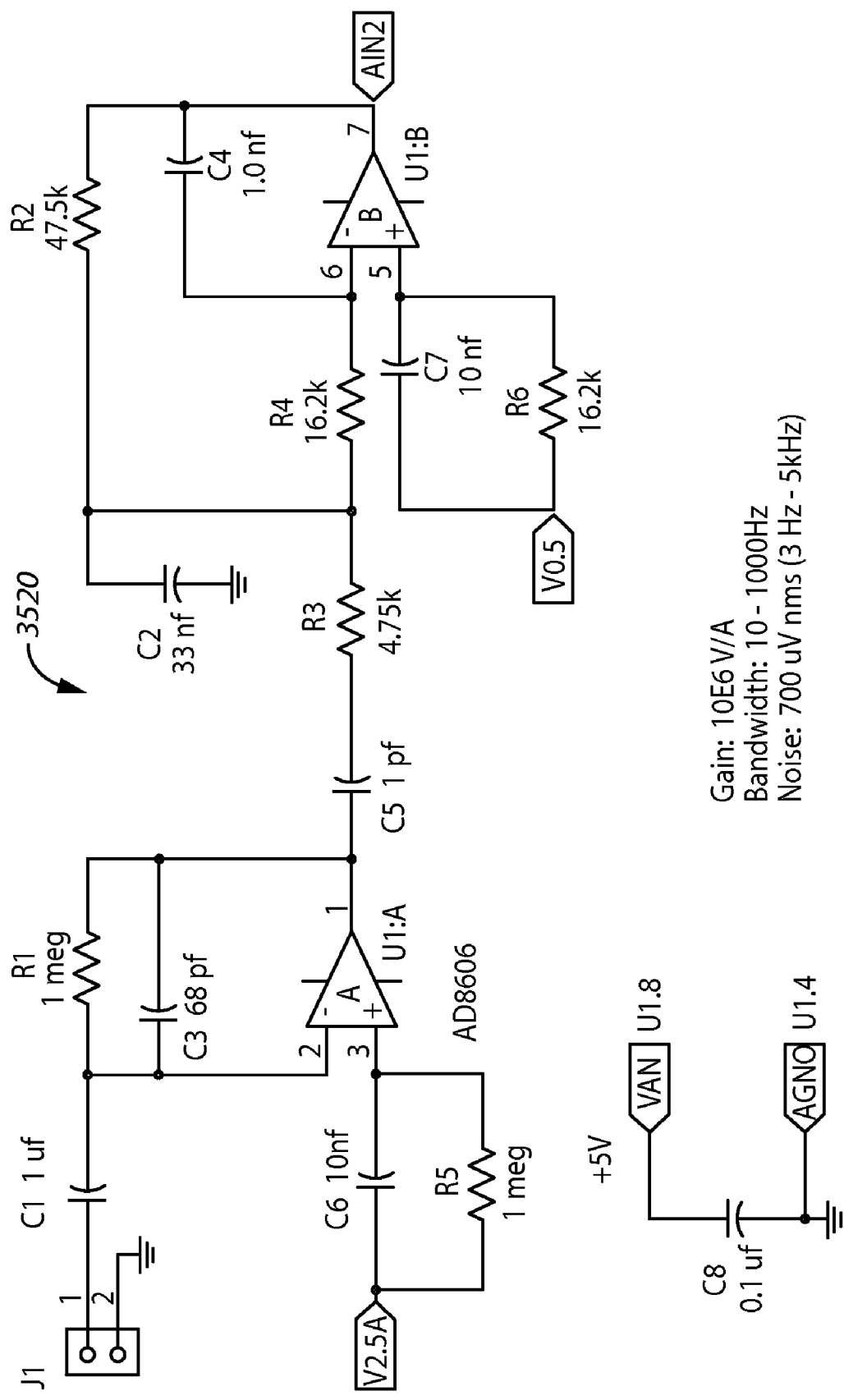
FIG. 35 shows a simplified circuit diagram of an amplifier that can be cooperated with a detector of FIG. 32.

FIG. 32 depicts a cross-sectional perspective view of a detector 3220 that can be incorporated into some embodiments of the detector system 120. The detector 3220 is an Si detector that operates, for example, in a visible band, and contains four quad silicon arrays 3222 that are each aligned with optics 3224. The arrays and optics are mounted in a housing 3226 that can be incorporated into the detection system 120. FIG. 33 shows an example of a matrix spot diagram 3320 for the optics 3224. FIG. 34 show a graphical representation of a spectral response 3420 of photo sensitivity versus wavelength of the detector 3220, along with a listing 3422 of ratings and characteristics of the silicon detector arrays according to some implementations. FIG. 35 shows a simplified circuit diagram of an amplifier 3520 that can be cooperated with a detector (e.g., detector 3220) of the detector unit 122 in amplifying one or more analog signals from the detectors. In some instances, input source specifications are: input resistance: 25 G Ohms (See detector specs); input source current: 2 nA-200 nA; input DC current: 3 mA; and input signal BW: <10 Hz-1000 Hz. Further, pre-amplifier specifications can include: Low noise trans-impedance amplifier; output voltage: 1 mV-3.3V (match to 8051 input voltage) with DC bias; and Total noise: <1 mV (10-1000 Hz).

Figure 36:
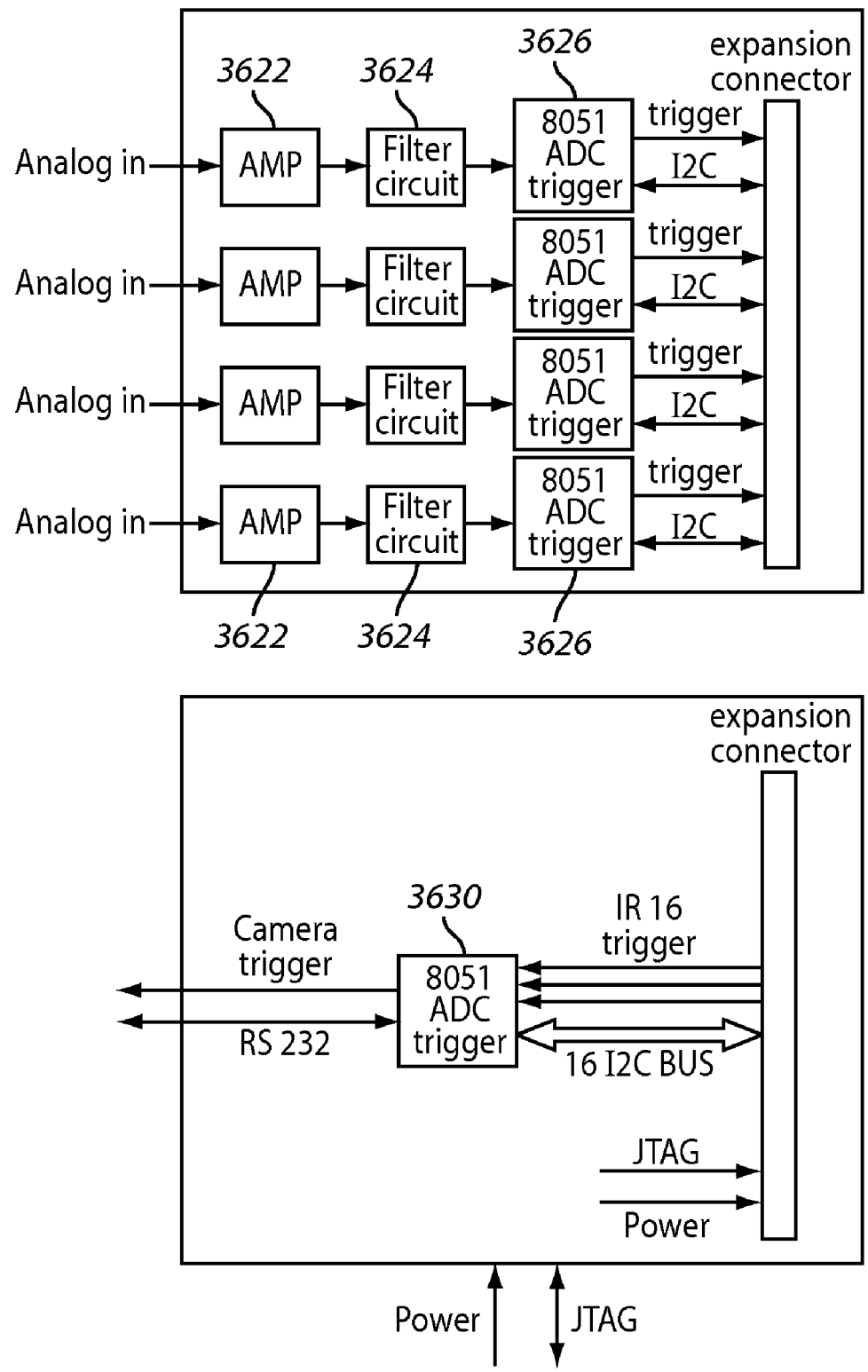
FIG. 36 shows a simplified block diagram of an example of trigger logic that evaluates detector signals and can trigger the imaging system.

FIG. 36 shows a simplified block diagram of an example of trigger logic 3620 that evaluates detector signals and can trigger the imaging system. The trigger logic includes a plurality of amplifiers 3622 that receive signals from one or more detectors of the detector unit 122. For example, the silicon and/or InSb detector signals can be passed through a 16-channel amplifier. In some implementations the amplified signals can be filtered through one or more filters 3624. The amplified signals are then forwarded to a plurality of controllers 3626, such as 8051 controllers that in turn are communicationally coupled with a main controller 3630.

According to some embodiments, trigger logic system consists of two 16 channel photo-detector circuits 3620 with flash 12 bit A/D conversion (which in some implementations are incorporated into controllers 3626) and data collection at 10 kHz, and a main trigger logic controller and/or board 3630 that generates triggers to the camera(s) and transfers data to FDC. In some implementations, amplifier circuits and/or trigger logic boards can be stacked. Main controller logic can determine the triggered detector, trigger the imaging system 124 (e.g., trigger an IR camera) to take two images, communicate trigger information and sample data to main flash detection controller and/or computer 132 via RS-232.

The data from the sensors (e.g., InSb and Si sensors), imaging system (e.g., which can include an IR camera), and GPS and/or IMU system (e.g., C-MIGIT III) are fed into a processor or computer (e.g., PC-104 computer) 134 that analyzes the data and produces geo-coordinates if the algorithm determines that a flash event of interest occurred.

Figure 37:
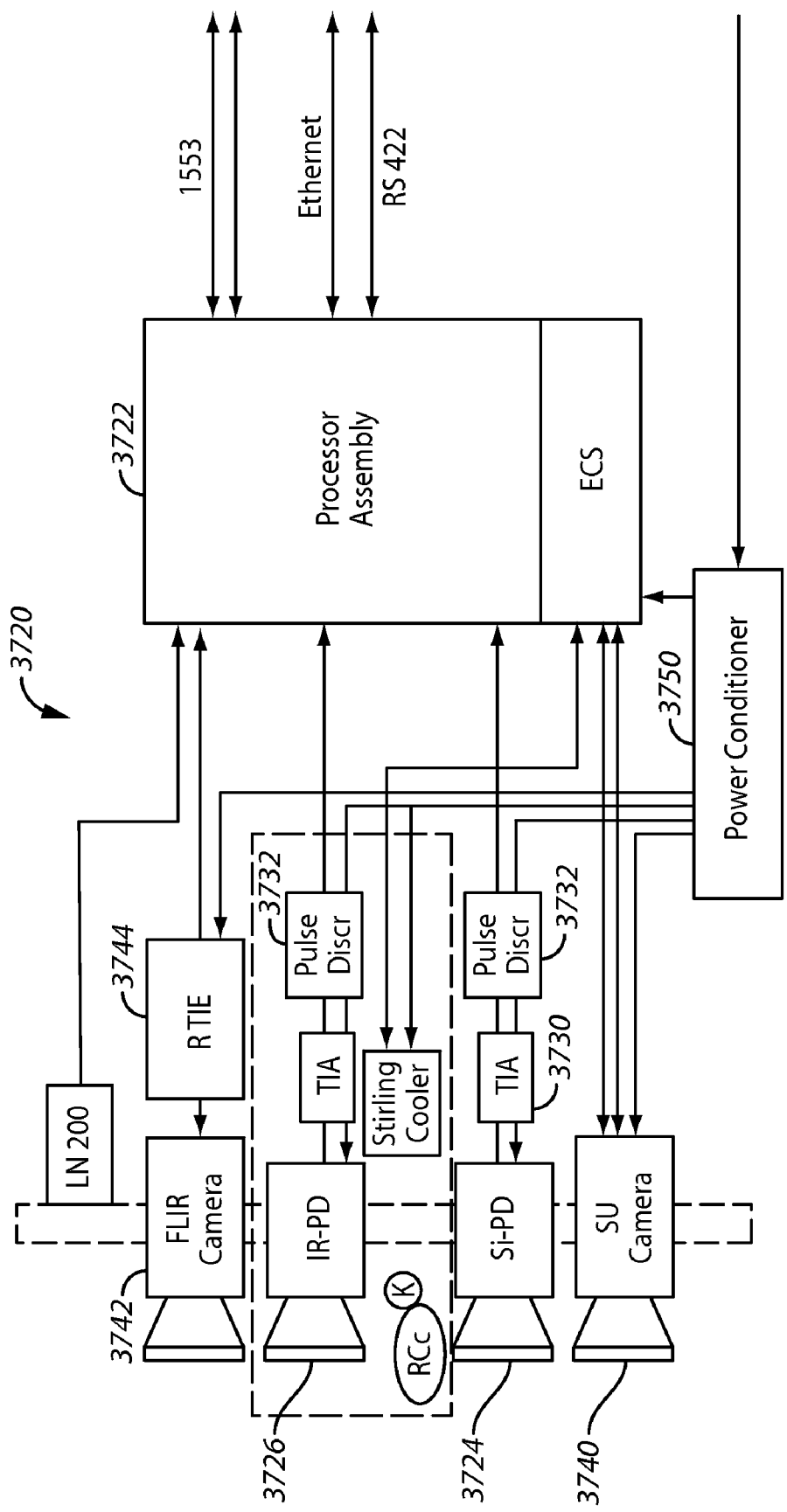
FIG. 37 depicts a simplified block diagram of an example implementation of a flash detection system.

FIG. 37 depicts a simplified block diagram of an example implementation of a flash detection system 3720. The detection system includes a processor or main controller 3722, coupled with a detector unit that includes an Si based photodetector 3724 and IR photo-detector 3726 each coupled with amplifiers 3730 (e.g., trans-impedance amplifiers). A discriminator is included that comprises one or more pulse discriminators 3732 that couple with the amplifiers to receive the detector signals. The discriminators signal the controller to trigger an imaging system that includes an SU camera 3740 and a FLIR camera 3742 (that may include and/or be coupled with real time imaging electronics 3744. A power source 3750 and/or power conditioner is also included to provide power to the system and components of the system.

Figure 38:
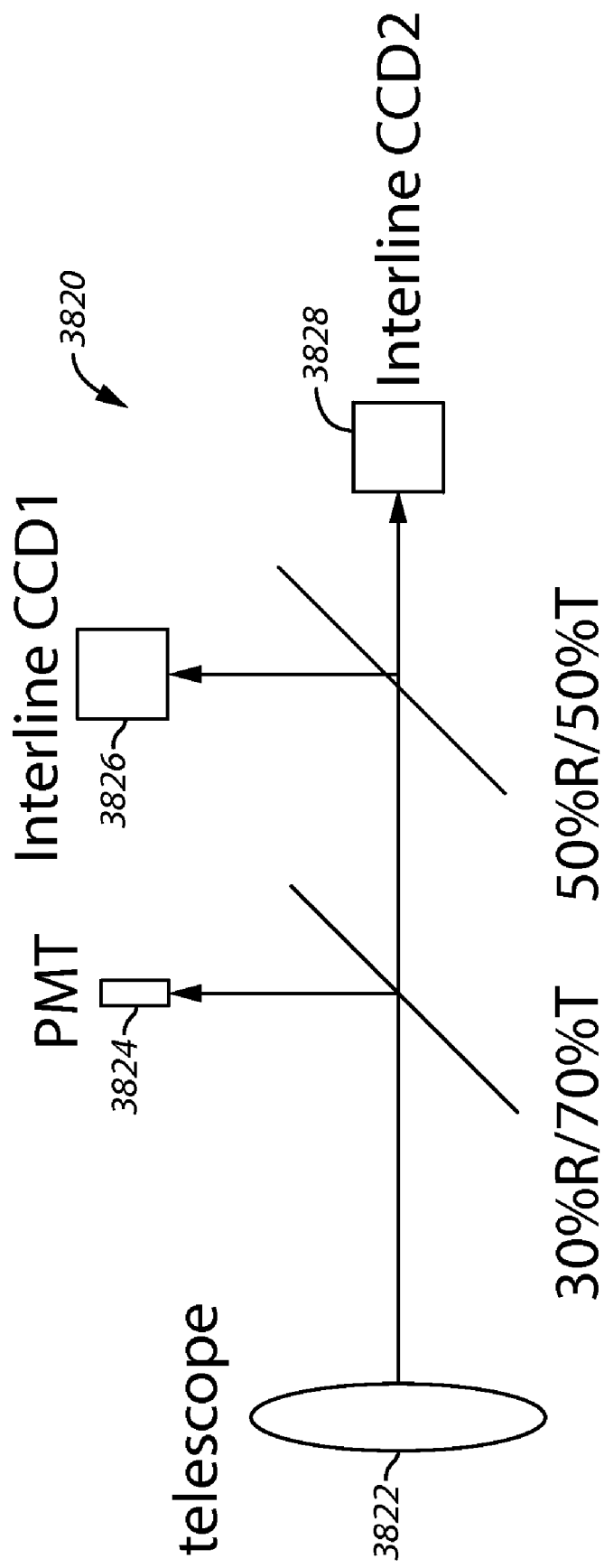
FIG. 38 shows a simplified block diagram of an additional or alternative flash detection system according to some embodiments.

FIG. 38 shows a simplified block diagram of an additional or alternative flash detection system 3820 according to some embodiments. A telescope and/or optics 3822 direct an image into the system where a photo-multiplier tube (PMT) 3824 collects light from the scene and/or FOV of the telescope 3822. A high pass filter can be included (not shown) that reduces background and selects for 'fast' events. A time history identification of flash events allows the system 3820 to classify and/or identify a type of event. First and second interline CCDs 3826 and 3828 capture images of the scene and/or FOV. One or more thresholds (or other logic) can be applied on fast event evaluation in triggering the CCDs. A length (in time) of the flash event can be determined by the PMT signal. This length can be used to gate CCDs and/or define exposure or integration periods. The images generated from the CCDs can be correlated and/or subtracted (e.g., image background subtraction) to generate a difference image that can be used to locate the flash event in space (e.g., coordinates). In some implementations, the CCDs and/or other cameras can be directed to and/or used to identify a perpetrator and context of the flash event.

Figure 39:
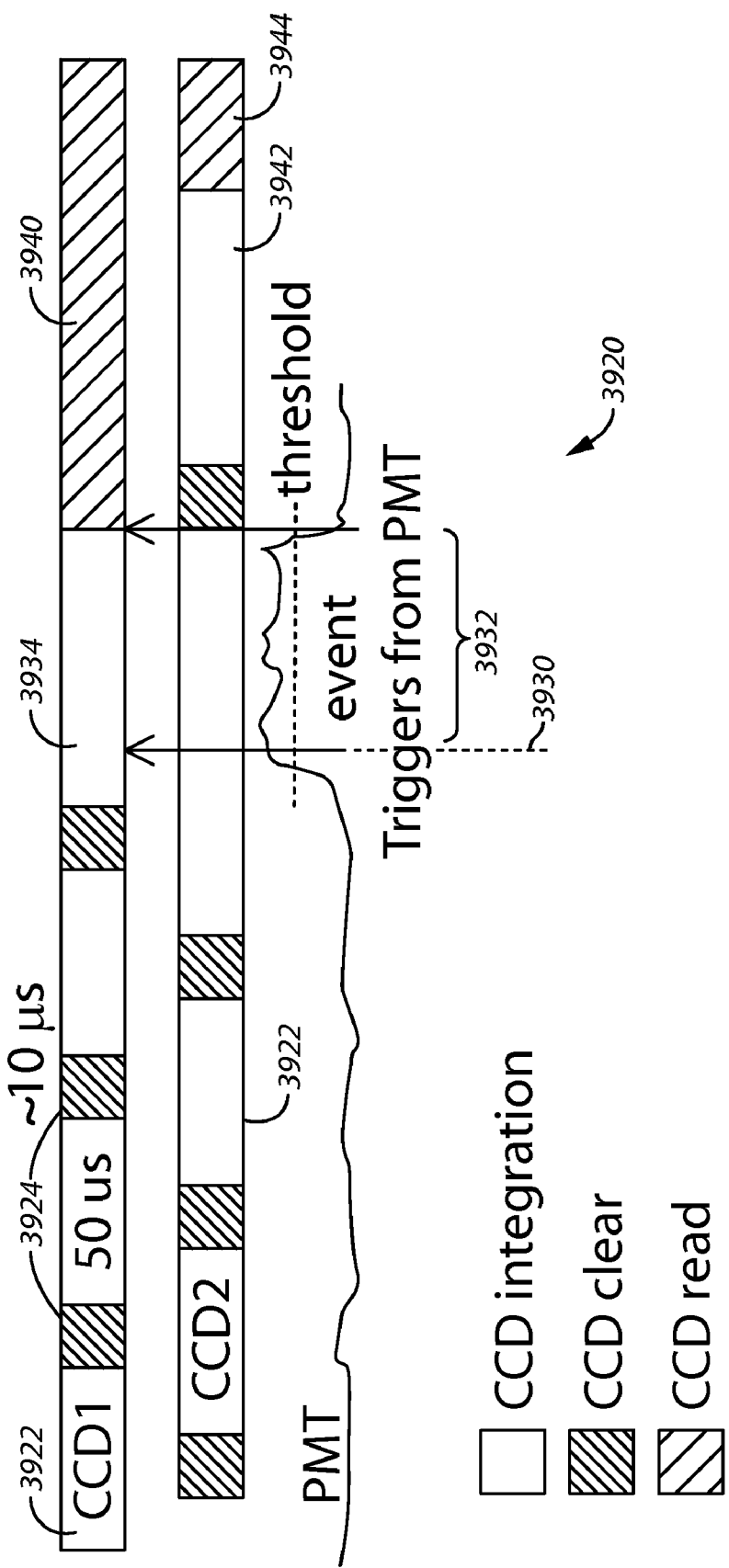
FIG. 39 depicts a function timeline representative of an example of CCD triggering for flash imagery according to some implementations.

FIG. 39 depicts a function timeline 3920 representative of an example of CCD triggering for flash imagery according to some implementations. The CCDs can be interline CCDs that operate in a continuous fashion repeatedly taking images and/or to capture video of a scene 3922. The interline CCDs can be cleared 3924 in a relatively short time (e.g., 10's of microseconds or less). Typically, the clearing of the CCDs is staggered so that one of the CCDs is capturing the scenery at substantially all times. When a flash event 3930 is detected, one of the currently active CCDs (one that is not being cleared) is activated or triggered 3934 (the first CCD in this example) by a PMT to capture an image during at least a portion of the duration 3932 of the event. Upon expiration of an integration and/or exposure time, the image is then read 3940 from the first CCD, the second CCD is cleared and a second image is captured 3942 (in some implementations, the second CCD's integration time matches the first CCD's integration time) by the second CCD and read out 3944. The imaging of scene by the second CCD can be taken substantially immediately after the first CCD with integration time appropriate for background light level. The system in some embodiments can include a light sensor or the like that can measure appropriate background light levels that can be used in setting the operation of the CCDs, such as integration time, exposure length and the like.

This allows continuous short integration time of the scene possible with readout of CCD when flash event is detected. A difference image can then be determined. With regard to a link budget, the resulting flash image typically has comparable or better SNR than the PMT. The detected light during the flash appears on one or more pixels of the difference image. In some implementations, integration time of the CCD can closely match the event time. The background subtraction acts as a notch filter in some embodiments.

Some present embodiments enable short duration flash detection, location and/or identification. Detectors, such as photodiode can collect light from a scene and apply high pass filtering that at least in part reduces background and selects for fast events. A time history identification of the event and in some instances a time history of a portion of the event can be used in identifying a type or cause of the event. Further, a rise time threshold or other threshold or other logic can be utilized on fast event triggers of the imaging system. A wide FOV image of a flash event is used to locate the event in space, in part by applying background subtraction. A narrow FOV CCD or other camera or optics can be utilized provide high resolution imaging of the scene following the flash event based on the location information obtained (e.g., an 8 cm GSD image of scene identifies source of flash).

Figure 40:
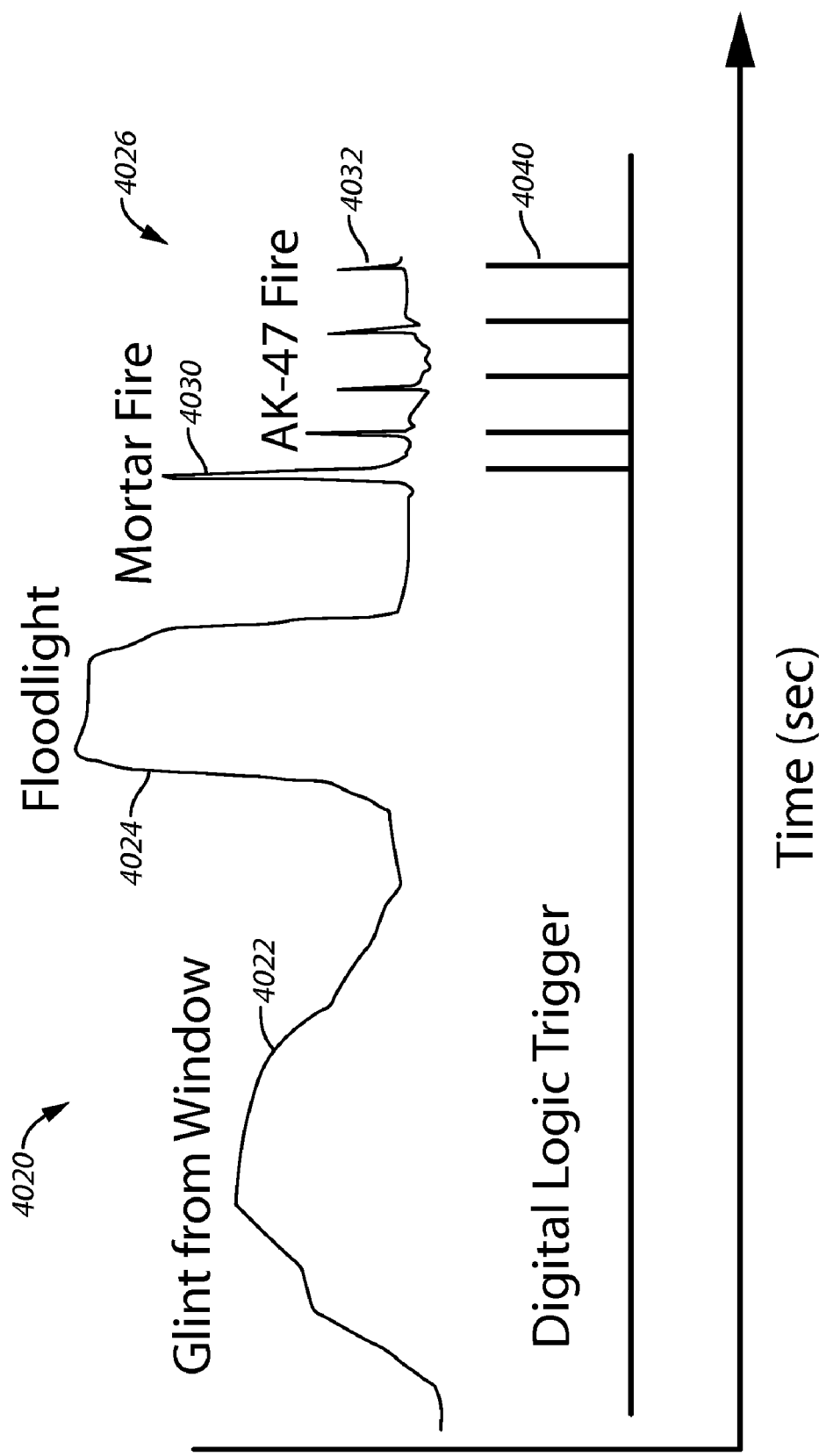
FIG. 40 shows a time line of signals and/or events detected by the detectors along with triggers activated by the system to capture flash events of interest.

FIG. 40 shows a time line 4020 of signals and/or events detected by the detectors along with triggers activated by the system to capture flash events of interest. Reflections and/or glints from windows or other sources 4022 can be readily distinguished from events of interest. Similarly, light sources 4024 (e.g., flood lights and the like) can be distinguish. Events of interest 4026, such as mortar fire 4030, small arms fire 4032, rocket-propelled grenades (RPGs), small rockets and the like can be detected and triggers 4040 can be activated to capture and locate these events.

Figure 41:
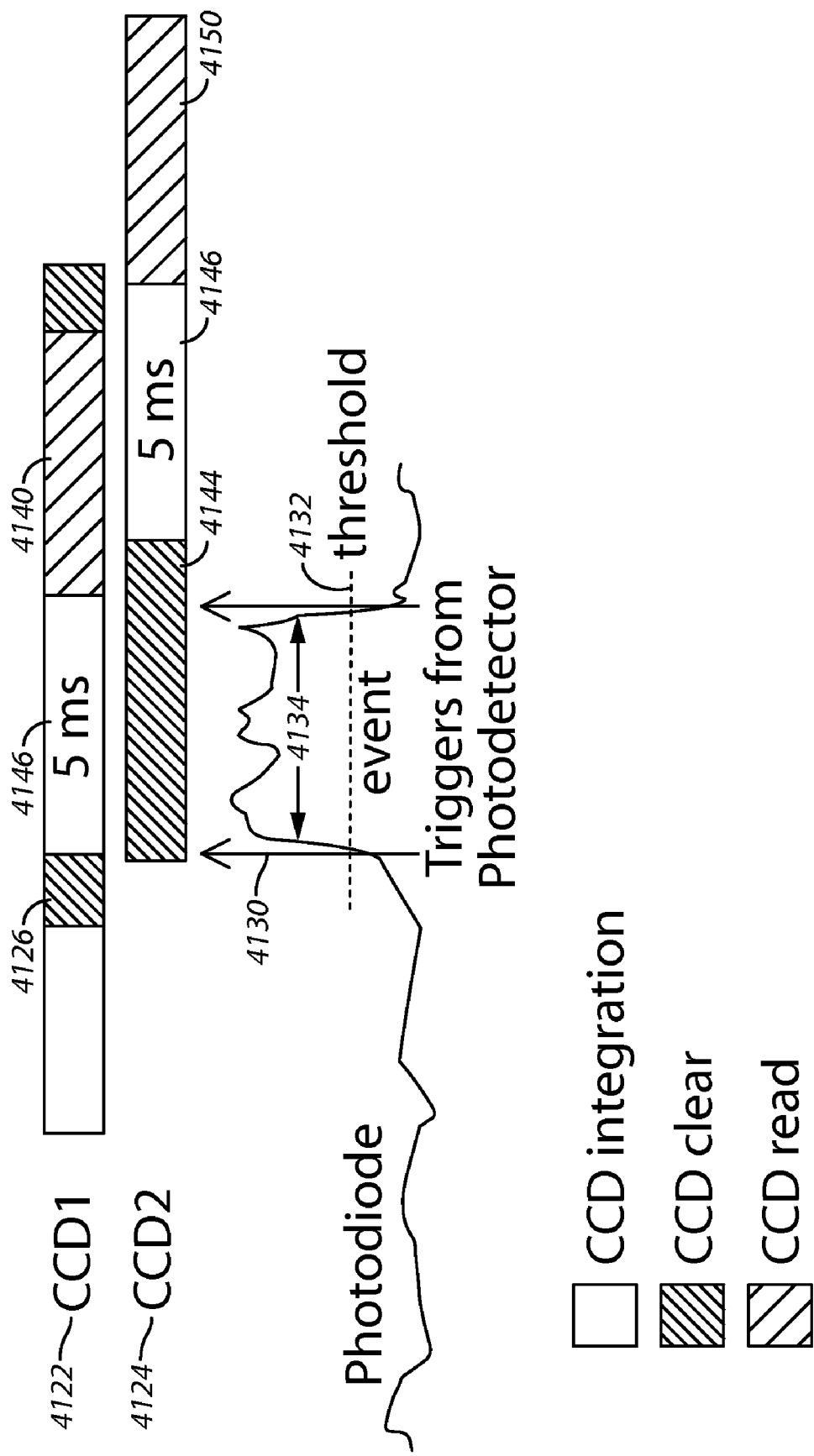
FIG. 41 depicts a time line function diagram demonstrating the imaging of an event.

FIG. 41 depicts a time line function diagram demonstrating the imaging of an event. At a time prior to an event detection, a first CCD 4122 is cleared 4126. Upon detection of the event 4130 (for example, when a rising edge exceeds a threshold 4132), the first CCD is activated to capture an image of at least a portion of the flash event 4134. In some embodiments, the duration of integration 4146 by the first CCD can be based on the duration of the event (e.g., when the falling edge of the detected signal passes below the threshold 4132 or a second threshold. The image is read out of the CCD during a time period 4140. The second CCD 4124 is cleared 4144 and following the flash event is triggered 4146 to capture a background image. In some implementations, the integration period of the second CCD is dependent on the integration period 4146 of the first CCD, background lighting and/or other factors. The background image is then read 4150 from the second CCD.

A difference image can be generated that includes the flash image through the correlation and/or subtraction of the two images. The activation of the second CCD to capture the image of scene can be taken, in some implementations, substantially immediately after read of the first CCD is initiated and/or buffered. Based on a link budget, the flash image typically has comparable or better SNR than a PMT triggering the imaging system. Light during the flash appears on one or ore pixels.

The CCDs can be implemented through one or more types of devices. For example, in some embodiments one of the CCDs can be implemented at least in part through a visible FPA. Some of the advantages of such an implementation include relatively low cost per pixel (e.g., cost of about $45 k camera) and large arrays available. As an example, a Kodak KAI-4020M 4 Mpixel CCD can be used as one or more of the CCDs. This CCD, however, may have some potential disadvantages of large solar background, stressing on background subtraction, and visible signature level may be low.

Additionally or alternatively, one or more of the CCDs can be implemented through a mid-wave IR FPA. Some advantageous of such implementation are relatively low solar background and large signature level, it is flight rated, and there is a library of signatures available. As an example, the Phoenix by Indigo Systems 640×512 pixels could be utilized. Some potential disadvantages may include relatively high cost per pixel (e.g., $130K camera) and limited format size.

In some implementations, one or more of the systems and/or processes described above can be implemented for use in flash detection for finding muzzle flashes from military weapons. This technology, however, is applicable to substantially any use in which relatively short duration pulses are to be detected and localized. As an additional example, this technology can be incorporated into an Identify-Friend or Foe (IFF) system where a strobe emitter can be attached to a friendly unit. The strobe would be designed to have a very short duration pulse, a specific emission spectrum and/or low-probability of intercept (LPI). The flash detection scheme would be able to identify the location of friendly forces based on time history and spectral characteristics of the pulse. The strobe could be designed to operate independently or with a global time-synch. Additionally, the system can be used to detect and/or locate substantially any relevant flash event. The flash events can have durations of less then 50 ms, however, other duration flashes can be captures, such as flashes with durations of a second or more, of a minute or more, and of longer durations.

While the invention herein disclosed has been described by means of specific embodiments and applications thereof, numerous modifications and variations could be made thereto by those skilled in the art without departing from the scope of the invention set forth in the claims.

What is claimed is:

1. A method of detecting flash events, the method comprising:
   detecting a flash event;
   triggering an imaging system in response to detecting the flash event to capture a first image including at least a portion of the flash event; and
   determining a location of the flash event.

2. The method of claim 1, further comprises:
   isolating the captured flash event based at least in part on the first image.

3. The method of claim 1, further comprises:
   wherein the determining step comprises determining a location of the flash event within a field of view of the imaging system.

4. The method of claim 3, further comprising:
   triggering the imaging system to capture a second image with substantially the same field of view as the first image and without the flash event; and
   the isolating the captured flash event comprises subtracting the second image from the first image producing a difference image comprising the captured flash event.

5. The method of claim 1, wherein the triggering of the imaging system comprises determining a temporal signature of the detected flash event, and determining whether the temporal signature correlates with a known temporal signature.

6. The method of claim 5, wherein the triggering comprises generating a spectral signature of the detected flash event, and determining whether the spectral signature correlates with a known spectral signature and implementing the triggering when both the temporal and spectral signatures correlate with the known temporal signature and the known spectral signature.

7. A method of detecting flash events, the method comprising:
   detecting a flash event;
   temporally evaluating the flash event;
   determining whether the flash event is an event of interest based on the temporal evaluation; and
   triggering an imaging system to capture a first image including the flash event when the flash event is an event of interest.

8. The method of claim 7, wherein the temporally evaluating the flash event comprises determining whether a rise time of the flash event meets a threshold rise time.

9. The method of claim 7, further comprising:
   spectrally evaluating the flash event; and
   wherein the determining whether the flash event is an event of interest comprises determining whether the flash event is an event of interest based on the temporal and spectral evaluations.

10. The method of claim 9, further comprises:
classifying the flash event based on the spectral evaluation.

11. The method of claim 7, further comprising:
triggering the imaging system to capture a second image after the flash event; and
processing the first image and the second image to isolate the flash event within a field of view of the imaging device.

12. The method of claim 11, further comprises:
subtracting the second image from the first image producing a difference image that isolates the flash event within the field of view of the first image; and
determining a geo-location of the flash event based on the isolated flash event.

13. A method of detecting a flash, comprising:
detecting a flash event;
determining a portion of a temporal signature of the flash event while the flash event is in progress;
evaluating the portion of the temporal signature;
determining whether the flash event is a flash event of interest based on the portion of the temporal signature; and
triggering an imaging system to capture an image including a portion of the flash event when the flash event is determined to be a flash event of interest based at least on the portion of the temporal signature.

14. The method of claim 13, further comprising:
determining a spectral signature of at least a portion of the flash event;
evaluating the spectral signature; and
wherein the determining whether the flash event is the flash event of interest comprises determining whether the portion of the temporal signature and the spectral signature correspond with known signatures of interest.

15. The method of claim 14, wherein the detecting the flash comprises detecting a first wavelength band of the flash and a second wavelength band of the flash; and
wherein the determining the spectral signature comprises determining the spectral signature as a function of the detected first wavelength band of the flash and the detected second wavelength band of the flash.

16. The method of claim 13, wherein the evaluating the portion of the temporal signature comprises transforming the temporal signature to a transformed temporal signature; and
the determining whether the flash event is the flash event of interest comprises comparing the transformed temporal signature with one or more known transformed temporal signatures.

\* \* \* \* \*